(12) United States Patent
Yamamoto et al.

(10) Patent No.: US 10,128,990 B2
(45) Date of Patent: Nov. 13, 2018

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Tetsuya Yamamoto, Kanagawa (JP); Seigo Nakao, Singapore (SG); Hidetoshi Suzuki, Kanagawa (JP); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 2 days.

(21) Appl. No.: 15/088,269

(22) Filed: Apr. 1, 2016

(65) Prior Publication Data

US 2016/0218836 A1 Jul. 28, 2016

Related U.S. Application Data

(63) Continuation of application No. PCT/JP2014/005407, filed on Oct. 24, 2014.

(30) Foreign Application Priority Data

Jan. 31, 2014 (JP) .................................. 2014-017133

(51) Int. Cl.
*H04L 1/18* (2006.01)
*H04L 1/16* (2006.01)
*H04W 72/12* (2009.01)

(52) U.S. Cl.
CPC .......... *H04L 1/1858* (2013.01); *H04L 1/1664* (2013.01); *H04L 1/1671* (2013.01); *H04W 72/1284* (2013.01); *H04W 72/1289* (2013.01)

(58) Field of Classification Search
None
See application file for complete search history.

(56) References Cited

U.S. PATENT DOCUMENTS

2011/0045860 A1* 2/2011 Nam ..................... H04L 5/0023
455/509
2011/0081932 A1* 4/2011 Astely ..................... H04L 5/001
455/509

(Continued)

FOREIGN PATENT DOCUMENTS

WO 2012/086932 6/2012
WO 2012/149953 A1 11/2012

(Continued)

OTHER PUBLICATIONS

International Search Report of PCT application No. PCT/JP2014/005407 dated Jan. 27, 2015.
3GPP TR 36.888 V12.0.0, "Study on provision of low-cost Machine-Type Communications (MTC) User Equipments (UEs) based on LTE (Release 12)," Jun. 2013.

(Continued)

*Primary Examiner* — Andrew C Oh
(74) *Attorney, Agent, or Firm* — Seed IP Law Group LLP

(57) ABSTRACT

If repetition transmission is applied to a response signal for a downlink data signal and an uplink signal, the uplink signal is repeatedly transmitted using a certain number of consecutive subframes starting with a first subframe, at which the repetition transmission of the uplink signal starts, and the response signal is repeatedly transmitted using at least the certain number of consecutive subframes starting with a second subframe, at which the repetition transmission of the response signal starts. The first subframe is set to be the same as the second subframe.

10 Claims, 17 Drawing Sheets

(56) References Cited

U.S. PATENT DOCUMENTS

| | | | |
|---|---|---|---|
| 2011/0141928 A1* | 6/2011 | Shin | H04L 1/0028 370/252 |
| 2012/0002593 A1* | 1/2012 | Kim | H04L 1/1854 370/315 |
| 2013/0235768 A1* | 9/2013 | Earnshaw | H04L 1/1671 370/280 |
| 2013/0250924 A1 | 9/2013 | Chen et al. | |
| 2013/0272258 A1 | 10/2013 | Lee et al. | |
| 2014/0010126 A1* | 1/2014 | Sayana | H04J 3/1694 370/280 |
| 2014/0105155 A1* | 4/2014 | Kim | H04L 1/1861 370/329 |
| 2014/0269600 A1* | 9/2014 | Lee | H04L 5/0007 370/329 |
| 2015/0085788 A1* | 3/2015 | Kim | H04L 1/1829 370/329 |
| 2015/0131562 A1* | 5/2015 | Kim | H04L 1/1861 370/329 |
| 2015/0215909 A1* | 7/2015 | Takeda | H04L 1/1854 370/329 |
| 2015/0257144 A1* | 9/2015 | Hooli | H04W 72/0406 370/329 |

FOREIGN PATENT DOCUMENTS

| | | | | |
|---|---|---|---|---|
| WO | WO2012/149953 | * | 11/2012 | ............ H04W 72/04 |
| WO | 2013/138715 A1 | | 9/2013 | |

OTHER PUBLICATIONS

3GPP TS 36.211 V11.5.0, "Physical channels and modulation (Release 11)," Dec. 2013.

3GPP TS 36.212 V11.4.0, "Multiplexing and channel coding (Release 11)," Dec. 2013.

3GPP TS 36.213 V11.5.0, "Physical layer procedures (Release11)," Dec. 2013.

Extended European Search Report, dated Dec. 16, 2016, for corresponding EP Application No. 14880734.0-1851 / 3101970, 10 pages.

Communication pursuant to Article 94(3) EPC, dated Nov. 22, 2017, for corresponding European Patent Application No. 14 880 734.0-1875, 7 pages.

Ericsson, et al., "Framework for Scheduling Request and Buffer Status Reporting", 3GPP TSG-RAN WG2#60 R2-074691, Nov. 9, 2007, 5 pages.

* cited by examiner

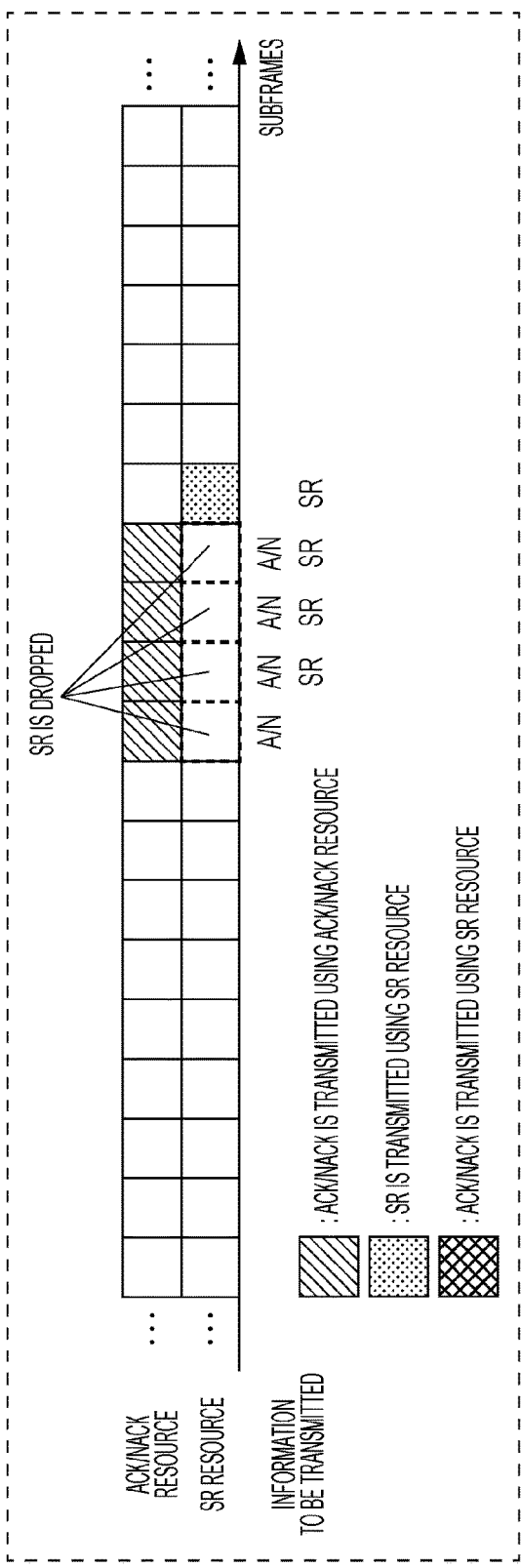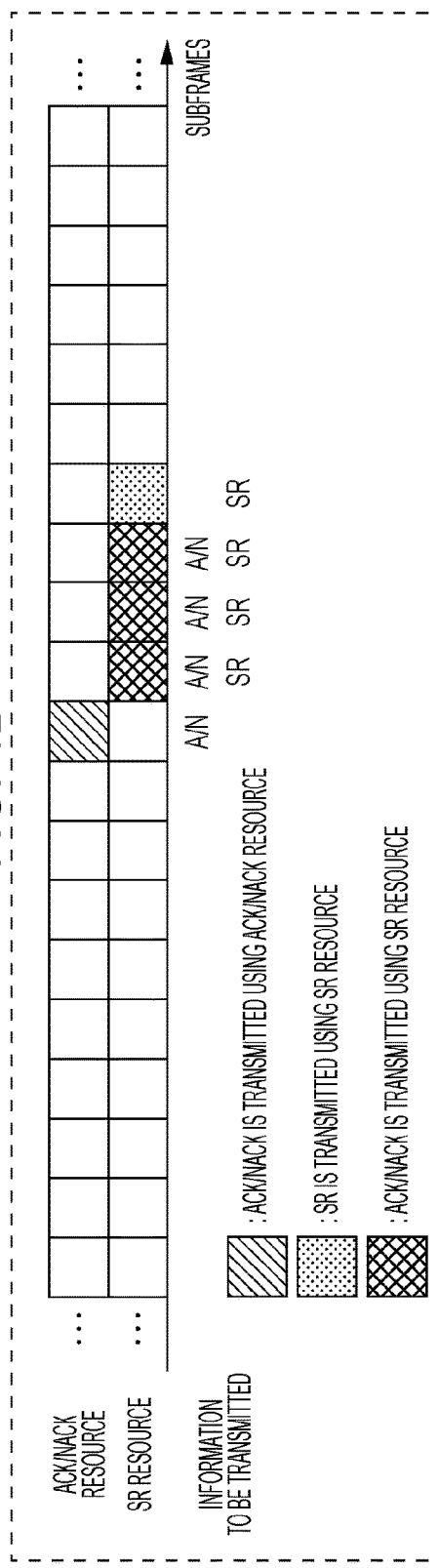

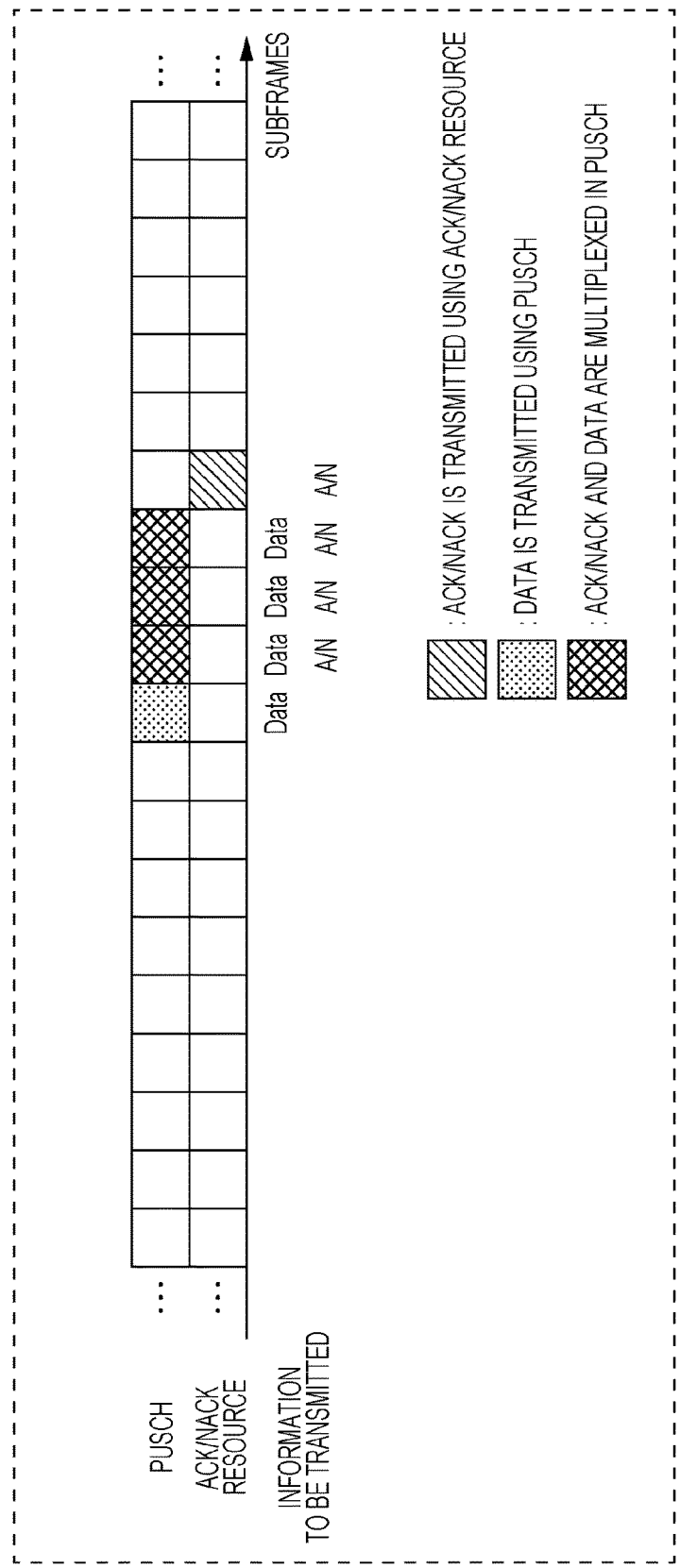

FIG. 13

| SR CONFIGURATION INDEX $I_{SR}$ | SR PERIODICITY (ms) $SR_{PERIODICITY}$ | SR SUBFRAME OFFSET $N_{OFFSET,SR}$ |
|---|---|---|
| 0 – 4 | 5 | $I_{SR}$ |
| 5 – 14 | 10 | $I_{SR}-5$ |
| 15 – 34 | 20 | $I_{SR}-15$ |
| 35 – 74 | 40 | $I_{SR}-35$ |
| 75 – 154 | 80 | $I_{SR}-75$ |
| 155 – 156 | 2 | $I_{SR}-155$ |
| 157 | 1 | $I_{SR}-157$ |

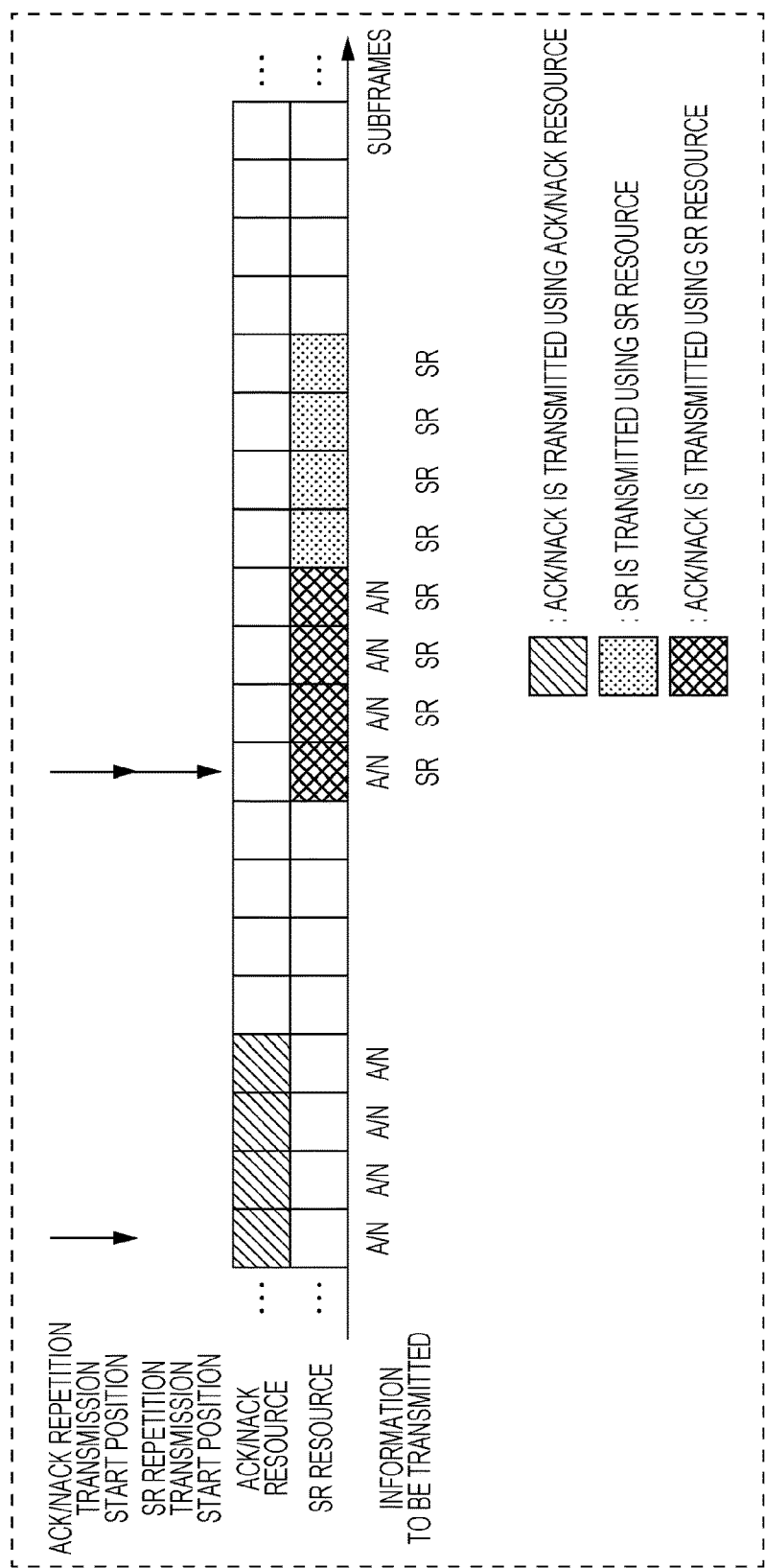

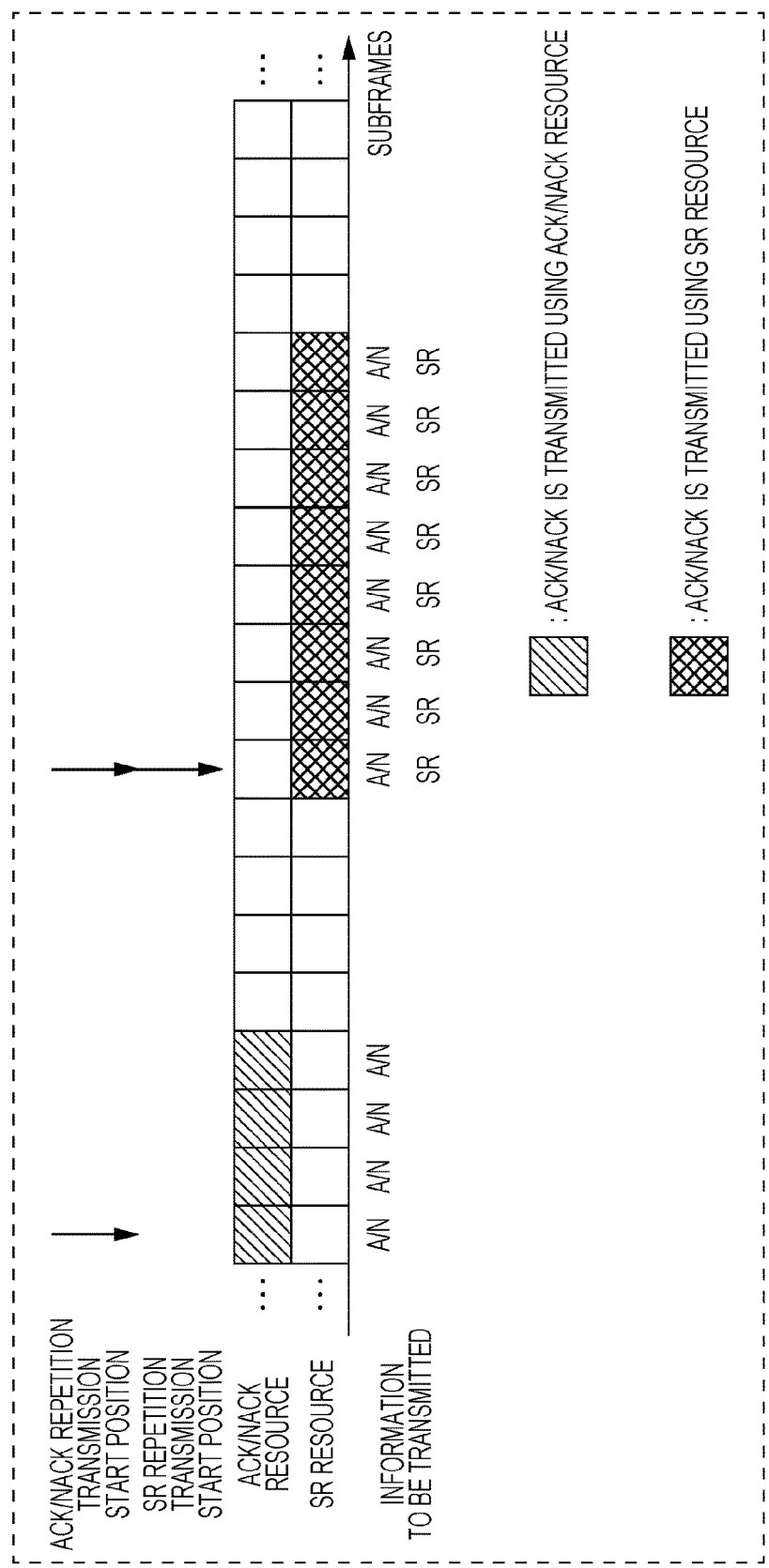

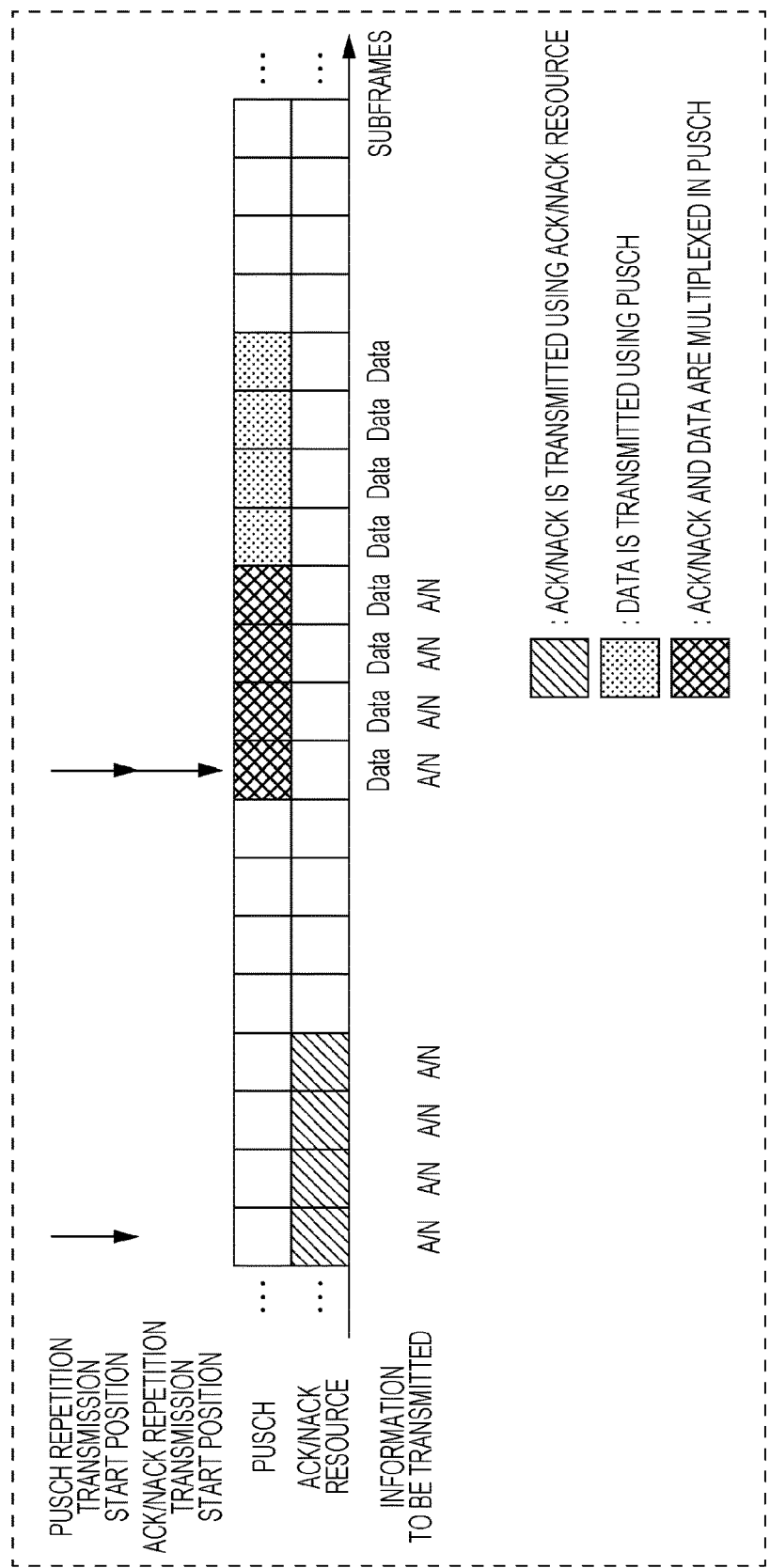

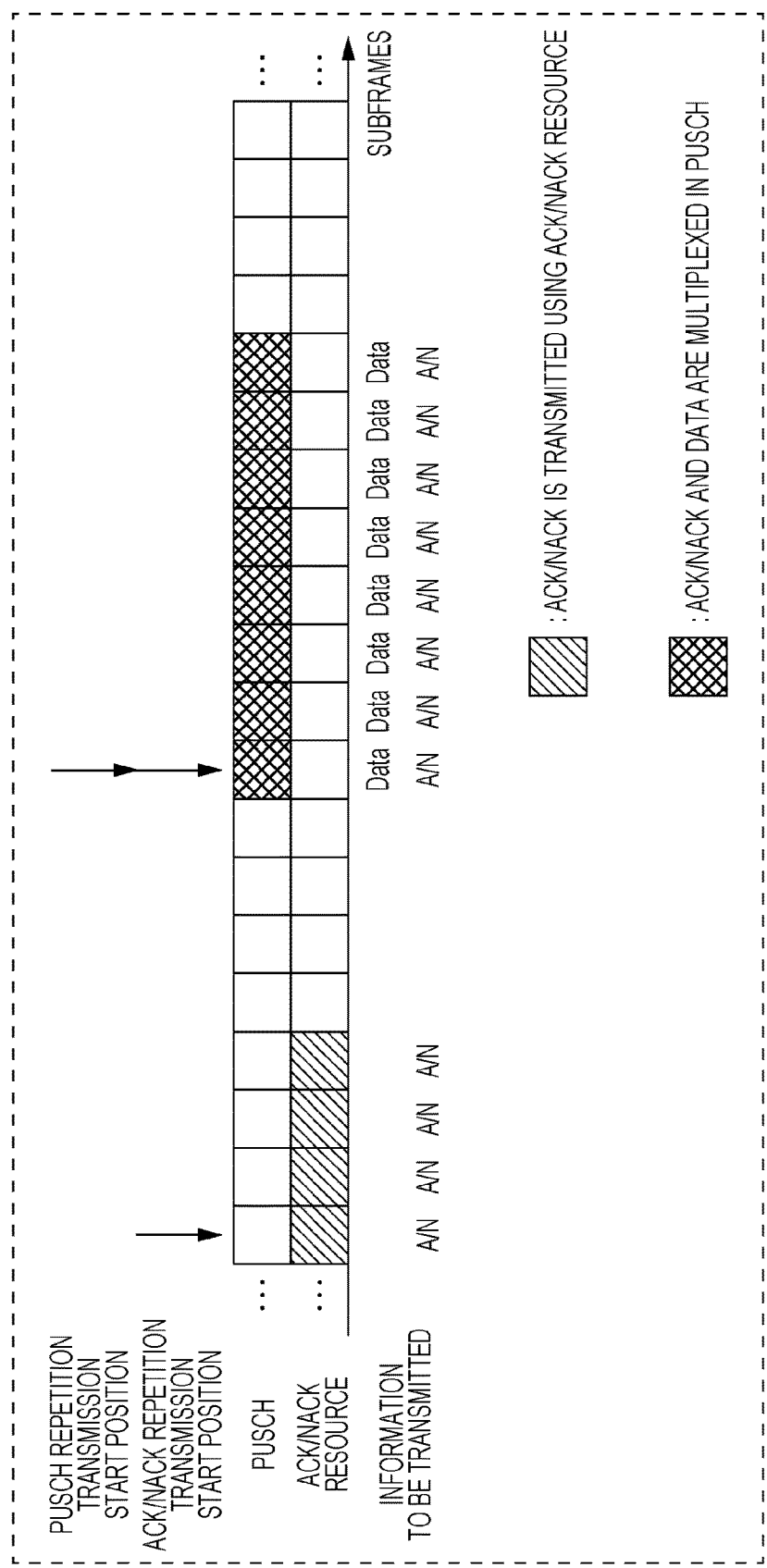

TERMINAL, BASE STATION, TRANSMISSION METHOD, AND RECEPTION METHOD

BACKGROUND

1. Technical Field

The present disclosure relates to a terminal, a base station, a transmission method, and a reception method.

2. Description of the Related Art

As a mechanism for supporting a future information society, a machine-to-machine (M2M) communication system that achieves services through autonomous communication between devices without asking users to make determinations is expected these years. A smart grid is a specific application of the M2M communication system. The smart grid is an infrastructure system that efficiently supplies a lifeline such as electricity or gas, and performs M2M communication between a smart meter installed in a household or a building and a central server in order to adjust a supply-demand balance of resources autonomously and effectively. Other applications of the M2M communication system include a monitoring system for article management, distance medicine, or the like and remote management of stock or charging of vending machines.

In the M2M communication system, in particular, use of cellular systems having large communication areas is gaining attention. The 3rd Generation Partnership Project (3GPP), which is a standardization group of cellular communication systems, is examining M2M based on a cellular network under a name of machine type communication (MTC) for standardization of long-term evolution (LTE) and LTE-Advanced. In particular, further expansion of communication areas is being examined in consideration of cases where MTC communication devices such as smart meters are provided in places such as basements of buildings and are not available in existing communication areas (e.g., refer to 3GPP TR 36.888 V12.0.0, "Study on provision of low-cost Machine-Type Communications (MTC) User Equipments (UEs) based on LTE," June 2013). In order to further expand the communication areas, for example, repetition, in which the same signals are transmitted a plurality of times, is being examined.

In a cellular communication system, channels used in uplink, which is communication from a terminal to a base station, are a physical uplink control channel (PUCCH) and a physical uplink shared channel (PUSCH). The PUCCH is a channel for transmitting a response to a downlink data signal transmitted through a physical downlink shared channel (PDSCH), such as a positive response (acknowledgement (ACK)) or a negative response (negative acknowledgement (NACK)) (hereinafter described as an "ACK/NACK"; also referred to as a "response signal"), and control information such as a scheduling request (SR) indicating a request to assign resources. On the other hand, the PUSCH is a channel for transmitting data signals. An ACK/NACK, for example, is 1-bit information indicating either ACK (no error) or NACK (there is an error). PUCCH resources used by the terminal to transmit an ACK/NACK and an SR are secured in advance. In the following description, PUCCH resources used for an ACK/NACK will be referred to as "ACK/NACK resources", and PUCCH resources used for an SR will be referred to as "SR resources".

Transmission of ACK/NACK and SR

In Release 11 (hereinafter referred to as "Rel. 11") of LTE, if transmission of a PUSCH is not assigned to the same subframe as one in which an ACK/NACK is transmitted, the ACK/NACK is transmitted through the PUCCH. In addition, for example, a signal point of binary phase-shift keying (BPSK) is used for an ACK/NACK, and an ACK is transmitted using a signal point of −1, and a NACK is transmitted using a signal point of +1.

FIG. 1 illustrates an example of transmission of an ACK/NACK and an SR using PUCCH resources in Rel. 11. "Information to be transmitted" illustrated in FIG. 1 indicates a signal to be transmitted in each subframe, and "A/N" indicates an ACK/NACK (the same holds in the subsequent drawings).

As illustrated in FIG. 1, if an SR is not transmitted in the same subframe as one in which an ACK/NACK is transmitted, the ACK/NACK is transmitted using an ACK/NACK resource. On the other hand, if transmission of an SR occurs in the same subframe as one in which an ACK/NACK is transmitted, the ACK/NACK is transmitted using an SR resource. In addition, in a subframe in which only transmission of an SR occurs, the SR is transmitted using an SR resource. If only an SR is transmitted, the SR is transmitted using a signal point of +1 (the same signal point as a NACK) in BPSK (e.g., refer to 3GPP TS 36.211 V11.5.0, "Physical channels and modulation (Release 11)," December 2013).

A base station identifies, through blind detection such as a power determination, a resource (an ACK/NACK resource or an SR resource) with which an ACK/NACK is transmitted. If determining that the ACK/NACK has been transmitted using an SR resource, the base station determines that there is an SR and decodes the ACK/NACK using a signal of the SR resource. On the other hand, if determining that the ACK/NACK has been transmitted using an ACK/NACK resource, the base station determines that there is no SR and decodes the ACK/NACK using a signal of the ACK/NACK resource. In addition, if detecting a signal of an SR resource at a timing other than timings (known timings) at which ACK/NACKs are received in response to downlink data signals, the base station determines that there is an SR.

Transmission of ACK/NACK and PUSCH

In Rel. 11, if transmission of a PUSCH is assigned to the same subframe as one in which an ACK/NACK is transmitted, the ACK/NACK is transmitted through the PUSCH.

FIG. 2 illustrates an example of transmission of a PUSCH and an ACK/NACK in Rel. 11. In "information to be transmitted" illustrated in FIG. 2, "Data" indicates an uplink data signal (hereinafter also referred to simply as "data") (the same holds in the subsequent drawings).

As illustrated in FIG. 2, in a subframe in which only an ACK/NACK is transmitted, the ACK/NACK is transmitted using an ACK/NACK resource. In addition, in a subframe only data is assigned, the data is transmitted using a PUSCH.

In addition, as illustrated in FIG. 2, if data is assigned to the same subframe as one in which an ACK/NACK is transmitted, the ACK/NACK is time-multiplexed with a data signal and transmitted in a PUSCH. More specifically, by puncturing part of a data signal mapped in a resource adjacent to a reference signal (RS), the ACK/NACK is arranged in the resource for that part (e.g., refer to 3GPP TS 36.212 V11.4.0, "Multiplexing and channel coding (Release 11)," December 2013).

The base station determines whether an ACK/NACK is included in a received PUSCH through blind detection. Here, the base station can detect a timing at which an ACK/NACK is transmitted in response to a downlink data signal (PDSCH) on the basis of assignment of the downlink data signal in a physical downlink control channel (PDCCH). The base station can therefore decode the PUSCH while assuming that an ACK/NACK is included, without performing blind detection in a subframe in which the terminal must transmit the ACK/NACK. Due to the following reason, however, the base station determines presence or absence of an ACK/NACK through blind detection. If the terminal fails to receive a PDCCH with which the terminal is notified of assignment of a downlink data signal, the terminal does not transmit an ACK/NACK but transmits only a data signal using a PUSCH. At this time, the PUSCH includes only the data signal, but if the base station decodes the PUSCH while assuming that the PUSCH includes an ACK/NACK, data signal decoding properties deteriorate. The base station therefore, initially needs to determine whether an ACK/NACK is included.

Repetition

In Rel. 11, ACK/NACK repetition in the PUCCH in which the maximum number of repetitions is six is introduced. FIG. 3 illustrates an example of ACK/NACK repetition and SR transmission in PUCCH resources in Rel. 11.

An ACK/NACK repetition is transmitted using ACK/NACK resources secured in advance. In addition, as illustrated in FIG. 3, if transmission of an SR occurs in the same subframe as one in which transmission of an ACK/NACK repetition, priority is given to the transmission of the ACK/NACK repetition using an ACK/NACK resource, and the SR is dropped (not transmitted) (e.g., refer to 3GPP TS 36.213 V11.5.0, "Physical layer procedures (Release 11)," December 2013).

SUMMARY

In order to achieve the above-described further expansion of the communication areas, introduction of repetition is closely examined in LTE-Advanced Release 12 (hereinafter referred to as "Rel. 12") and later. Although ACK/NACK repetition is specified in Rel. 11, the number of repetitions is desired to be increased in order to further expand the communication areas. In addition, SR repetition and PUSCH repetition, which are not conducted in Rel. 11, are also effective.

Details of a case in which repetition transmission is applied to a plurality of signals such as an ACK/NACK, an SR, and a PUSCH, however, have not yet been examined.

One non-limiting and exemplary embodiment provides a terminal, a base station, a transmission method, and a reception method capable of avoiding deterioration of signal reception properties (decoding properties, detection properties, and the like) when repetition transmission is applied to at least two of an ACK/NACK, an SR, and a PUSCH.

In one general aspect, the techniques disclosed here feature a terminal including a receiver that receives information indicating a first subframe at which repetition transmission of an uplink signal starts and a second subframe at which repetition transmission of a response signal for a downlink data signal starts, and a transmitter that repeatedly transmits the uplink signal using a certain number of consecutive subframes starting with the first subframe and the response signal using at least the certain number of consecutive subframes starting with the second subframes. The first subframe is set to be the same as the second subframe.

According to an aspect of the present disclosure, deterioration of signal reception properties can be avoided when repetition transmission is applied to at least two of an ACK/NACK, an SR, and a PUSCH.

It should be noted that these general or specific aspects may be implemented as a system and a computer program, or may be implemented as an arbitrary combination of a system, an apparatus, a method, and a computer program.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 4A and 4B illustrate a problem at a time when repetition transmission of an ACK/NACK and an SR is performed;

FIG. 5 illustrates a problem at a time when repetition transmission of an ACK/NACK and data is performed;

FIG. 13 illustrates parameters used for calculating start positions of SR repetition transmission according to the third embodiment of the present disclosure;

FIG. 15 illustrates a problem at a time when repetition transmission of an ACK/NACK and an SR according to a fifth embodiment of the present disclosure is performed;

FIG. 16 illustrates timings of repetition transmission of an ACK/NACK and an SR according to the fifth embodiment of the present disclosure;

FIG. 17 illustrates a problem at a time when repetition transmission of an ACK/NACK and data according to a sixth embodiment of the present disclosure is performed; and FIG. 18 illustrates timings of repetition transmission of an ACK/NACK and data according to the sixth embodiment of the present disclosure.

DETAILED DESCRIPTION

Understanding Forming Basis of Present Disclosure

First, a problem that can arise when repetition transmission is applied to a plurality of signals such as an ACK/NACK, an SR, and a PUSCH will be described.

Problem in Transmission of ACK/NACK and SR in PUCCH

FIGS. 4A and 4B illustrate examples of ACK/NACK repetition transmission and SR repetition transmission in the PUCCH.

If ACK/NACK repetition transmission and SR repetition transmission are performed in the PUCCH, the SR repetition transmission might occur during the ACK/NACK repetition transmission as illustrated in FIGS. 4A and 4B.

Figure 3:
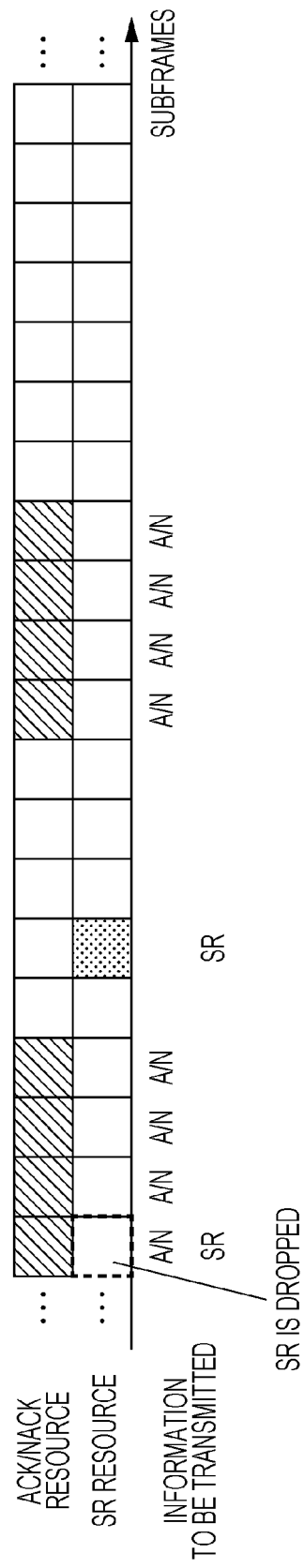
FIG. 3 illustrates an example of repetition transmission of an ACK/NACK in the PUCCH.

At this time, in a method (refer to FIG. 3) in which priority is given to the ACK/NACK repetition transmission as in Rel. 11, an SR in the same subframe as one in which an ACK/NACK is transmitted is dropped as illustrated in FIG. 4A, and a necessary number of SRs (four subframes in FIG. 4A) are not transmitted, thereby deteriorating SR detection properties in a base station.

Figure 1:
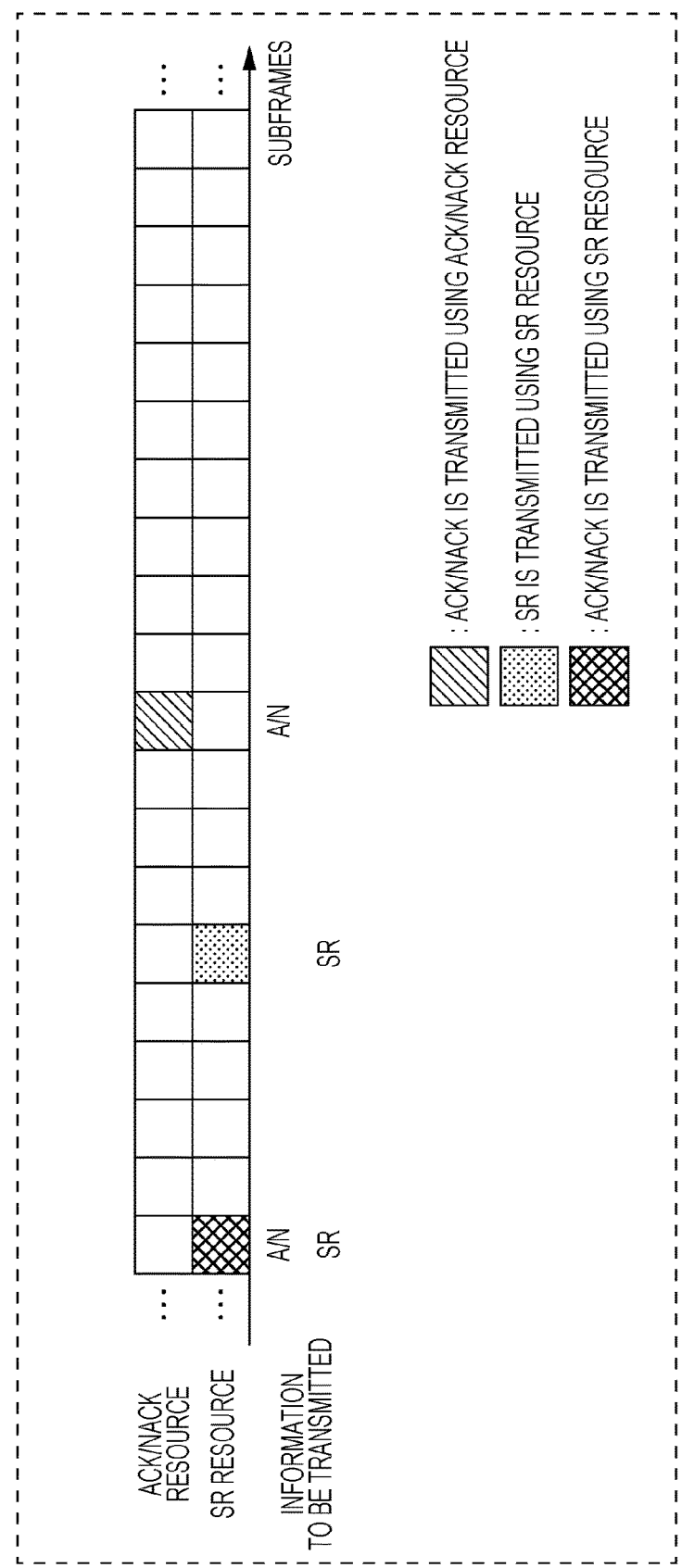
FIG. 1 illustrates an example of transmission of an ACK/NACK and an SR in a PUCCH.

On the other hand, if transmission of an SR occurs in the same subframe as one in which an ACK/NACK is transmitted, a method may be used in which the ACK/NACK is transmitted using an SR resource (refer to FIG. 1). In this method, however, as illustrated in FIG. 4B, resources used for transmitting ACK/NACKs might change from ACK/NACK resources to SR resources during the ACK/NACK repetition. Furthermore, the base station needs to identify, through blind detection such as a power determination, resources used for transmitting the ACK/NACKs, but in this method, the base station is likely to be unable to determine whether an SR is transmitted until all of repeatedly transmitted SRs are received. As a result, an accuracy of determining resources used for transmitting the ACK/NACKs might deteriorate, thereby deteriorating ACK/NACK decoding properties.

In addition to the case described with reference to FIGS. 4A and 4B in which "SR repetition transmission occurs during ACK/NACK repetition transmission", a case in which "ACK/NACK repetition transmission occurs during SR repetition transmission" (not illustrated) is possible. In this case, the base station can decode ACK/NACKs after receiving all of repeatedly transmitted SRs. A signal point of SR resources, however, might change during the SR repetition transmission because signals transmitted using the SR resources change from SRs to ACK/NACKs during the SR repetition transmission. As a result, in-phase combination cannot be performed at a time of detection of the SRs, and the SR detection properties might deteriorate.

Problem in Transmission of ACK/NACK and Data in PUSCH

FIG. 5 illustrates an example of ACK/NACK repetition transmission and PUSCH repetition transmission.

Figure 2:
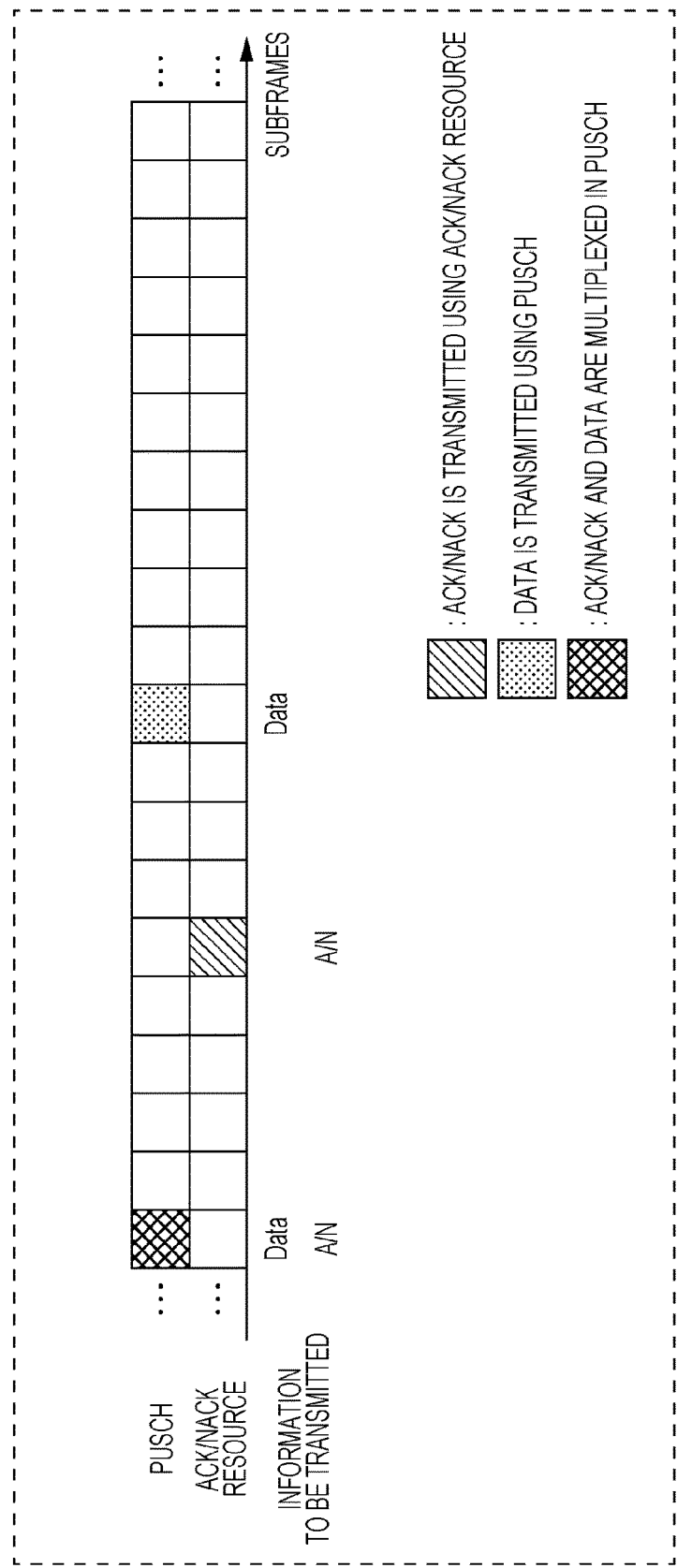
FIG. 2 illustrates an example of transmission of an ACK/NACK and data.

If ACK/NACK repetition transmission and PUSCH repetition transmission are performed, the ACK/NACK repetition transmission might occur during the PUSCH repetition transmission as illustrated in FIG. 5. At this time, in a subframe in which an ACK/NACK and a PUSCH (data signal) are assigned, a method may be used in which the data signal and the ACK/NACK are time-multiplexed with each other and transmitted in a PUSCH (refer to FIG. 2).

In this method, however, a signal in the PUSCH might change from a signal including only data to a signal in which data and an ACK/NACK are time-multiplexed with each other during the PUSCH repetition transmission. The base station needs to determine whether an ACK/NACK is included through blind detection. The base station, however, is likely to be unable to determine whether an ACK/NACK is included in a PUSCH until a signal including data and an ACK/NACK is received the number of repetitions of an ACK/NACK (four subframes in FIG. 5).

If content of a signal in a PUSCH changes during the PUSCH repetition transmission, therefore, an accuracy of determining whether an ACK/NACK is included in a PUSCH might deteriorate in the base station, thereby deteriorating the ACK/NACK decoding properties and PUSCH data decoding properties.

In addition to the case described with reference to FIG. 5 in which "ACK/NACK repetition transmission occurs during PUSCH repetition transmission", a case in which "PUSCH repetition transmission occurs during ACK/NACK repetition transmission" is possible. In this case, too, the same problem as above arises.

On the basis of the above knowledge, embodiments of the present disclosure will be described in detail hereinafter with reference to the drawings. In the embodiments, the same components are given the same reference numerals.

Overview of Communication System

In the following description, an frequency division duplex (FDD) system will be taken as an example.

In addition, a communication system according to each embodiment of the present disclosure is a system according to LTE-Advanced, for example, and includes a base station 100 and a terminal 200.

When transmitting an ACK/NACK, an SR, and a PUSCH, the terminal 200 applies repetition transmission to at least two of the ACK/NACK, the SR, and the PUSCH. When performing the repetition transmission, the terminal 200 repeatedly transmits each signal in consecutive subframes corresponding to a certain number of repetitions (repetition factor).

Figure 6:
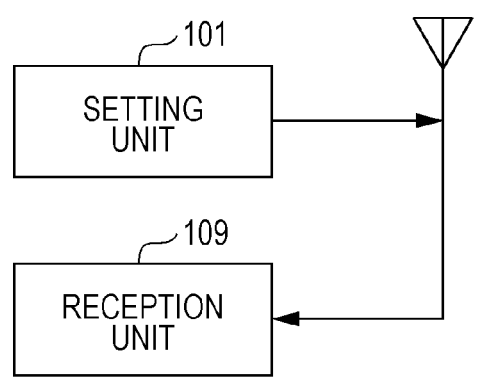
FIG. 6 illustrates essential components of a base station according to a first embodiment of the present disclosure.

FIG. 6 is a block diagram illustrating essential components of the base station 100 according to each embodiment of the present disclosure. In the base station 100 illustrated in FIG. 6, a setting unit 101 generates control information (timing information) for identifying a first subframe (start position) at which repetition transmission of an uplink signal (an SR or an uplink data signal) starts and a second subframe (start position) at which repetition transmission of a response signal (ACK/NACK) for a downlink data signal starts. A reception unit 109 receives, from the terminal 200 to which the control information has been transmitted, an uplink signal repeatedly transmitted using a certain number of consecutive subframes starting with the first subframe and a response signal repeatedly transmitted using at least the certain number of consecutive subframes starting with the second subframe. It is to be noted that the first subframe (start position) of the repetition transmission of the uplink signal (the SR or the uplink data signal) is set to be the same as the second subframe (start position) for the ACK/NACK repetition transmission. The "setting subframes (start positions) to be the same" refers to setting the same subframes (time resources) (the start positions are temporally identical). In addition, if a plurality of first subframes and a plurality of second subframes are set, the "setting subframes (start positions) to be the same" refers to setting each of the plurality of first subframes to be the same as one of the plurality of second subframes.

Figure 7:
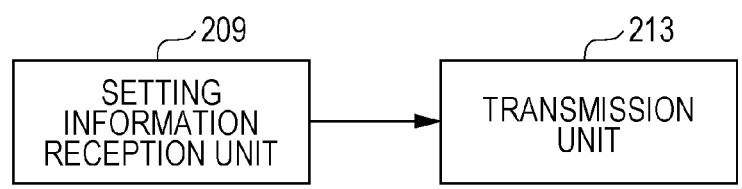
FIG. 7 illustrates essential components of a terminal according to the first embodiment of the present disclosure.

FIG. 7 is a block diagram illustrating essential components of the terminal 200 according to each embodiment of the present disclosure. In the terminal 200 illustrated in FIG. 7, a setting information reception unit 209 receives information indicating a first subframe (start position) at which repetition transmission of an uplink signal (an SR or an uplink data signal) starts and a second subframe (start position) at which repetition transmission of a response signal (ACK/NACK) for a downlink data signal starts. A transmission unit 213 repeatedly transmits the uplink signal using a certain number of consecutive subframes starting with the first subframe and the response signal using at least the certain number of consecutive subframes starting with the second subframe.

First Embodiment

Configuration of Base Station

Figure 8:
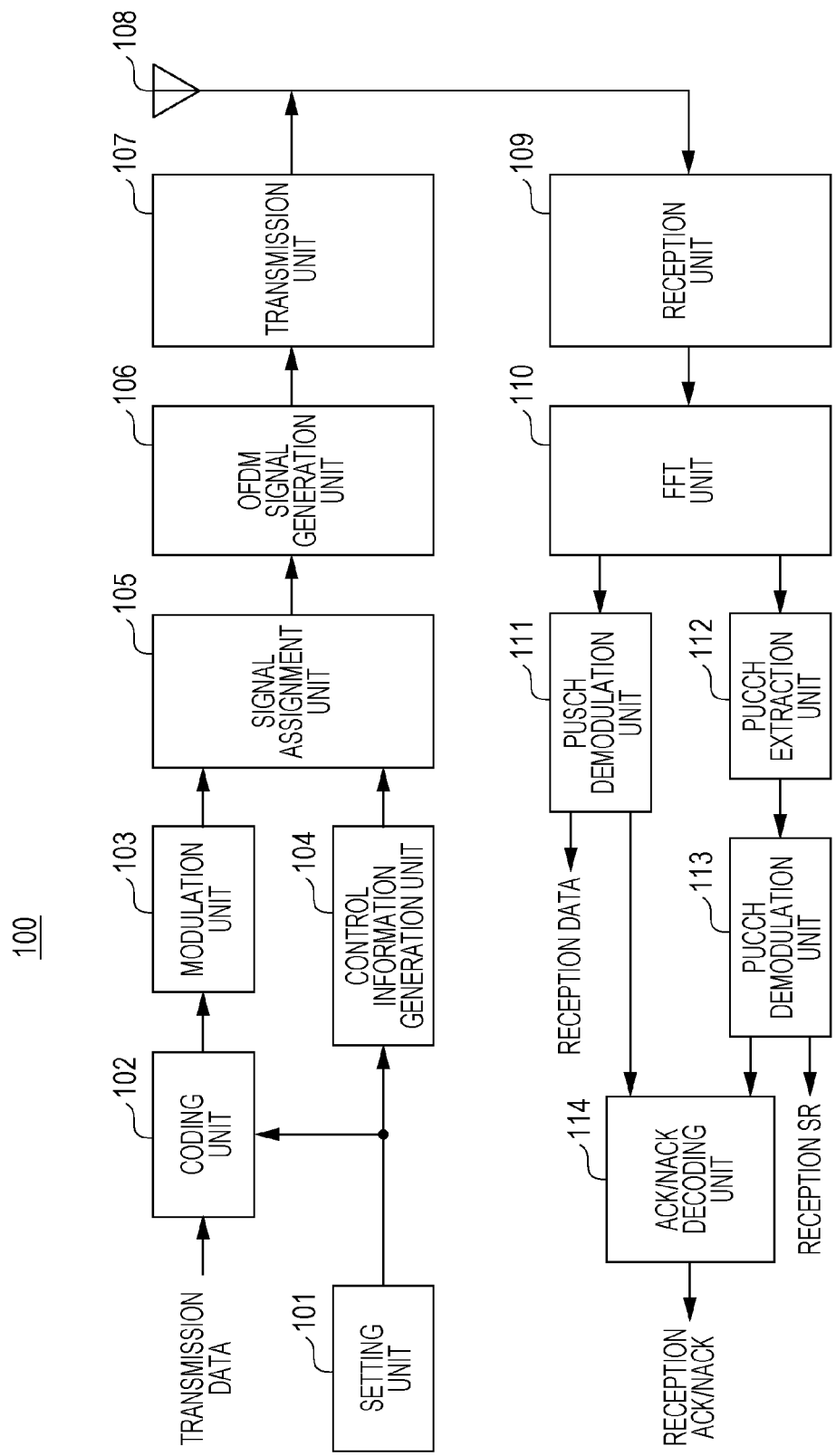
FIG. 8 illustrates the configuration of the base station according to the first embodiment of the present disclosure.

FIG. 8 is a block diagram illustrating the configuration of the base station 100 according to a first embodiment of the present disclosure. In FIG. 8, the base station 100 includes the setting unit 101, a coding unit 102, a modulation unit 103, a control information generation unit 104, a signal assignment unit 105, an orthogonal frequency-division multiplexing (OFDM) signal generation unit 106, a transmission unit 107, an antenna 108, the reception unit 109, a fast Fourier transform (FFT) unit 110, a PUSCH demodulation unit 111, a PUCCH extraction unit 112, a PUCCH demodulation unit 113, and an ACK/NACK decoding unit 114.

The setting unit 101 generates timing information regarding subframes (hereinafter referred to as "start positions") at which repetition transmission of at least two of an ACK/NACK, an SR, and a PUSCH starts in the terminal 200. The timing information may be assigned to a PDCCH and transmitted to the terminal 200, or may be transmitted to the terminal 200 in a semi-static manner as a higher layer control signal (radio resource control (RRC)). If the timing information is assigned to a PDCCH and transmitted to the terminal 200, the setting unit 101 outputs the timing information to the control information generation unit 104. If the timing information is transmitted as a higher layer control signal, the setting unit 101 outputs the timing information to the coding unit 102. Details of a method for setting start positions of repetition transmission used by the setting unit 101 will be described later.

The coding unit 102 performs error correction coding, such as turbo coding, on transmission data (a bit sequence, that is, a downlink data signal) and outputs a resultant coded bit sequence to the modulation unit 103.

The modulation unit 103 performs a data modulation process on the coded bit sequence received from the coding unit 102 and outputs a resultant data modulation signal to the signal assignment unit 105.

The control information generation unit 104 generates control information to be assigned to a PDCCH, performs a coding and modulation process on the control information, and outputs a resultant control information modulation signal to the signal assignment unit 105.

The signal assignment unit 105 maps a data modulation signal received from the modulation unit 103 in a downlink data signal assignment resource and outputs the mapped signal to the OFDM signal generation unit 106. In addition, the signal assignment unit 105 maps the control signal modulation signal received from the control information generation unit 104 in a downlink control information assignment resource and outputs the mapped signal to the OFDM signal generation unit 106.

The OFDM signal generation unit 106 performs subcarrier mapping and an inverse fast Fourier transform (IFFT) process on the signals received from the signal assignment unit 105 to generate a time-domain OFDM signal. The OFDM signal generation unit 106 outputs the generated OFDM signal to the transmission unit 107.

The transmission unit 107 performs an radio frequency (RF) process such as digital-to-analog (D/A) conversion or up-conversion on the OFDM signal received from the OFDM signal generation unit 106 and transmits a radio signal to the terminal 200 through the antenna 108.

The reception unit 109 performs an RF process such as down-conversion or A/D (Analog-to-Digital) conversion on a radio signal received from the terminal 200 through the antenna 108 and outputs a resultant baseband discrete Fourier transform-spread-orthogonal frequency-division multiplexing (DFT-S-OFDM) signal to the FFT unit 110. The received DFT-S-OFDM signal includes an ACK/NACK, an SR, or a PUSCH subjected to repetition transmission.

The FFT unit 110 converts the DFT-S-OFDM signal received from the reception unit 109 into a frequency-domain signal by performing an FFT process. The FFT unit 110 outputs the resultant frequency-domain signal to the PUSCH demodulation unit 111 and the PUCCH extraction unit 112.

The PUSCH demodulation unit 111 extracts a PUSCH from the signal received from the FFT unit 110 and demodulates the extracted PUSCH. More specifically, the PUSCH demodulation unit 111 determines whether the PUSCH includes an ACK/NACK through a blind determination. If determining that an ACK/NACK is not included, the PUSCH demodulation unit 111 demodulates a data signal and performs an error correction process such as turbo coding and an error detection process such as a CRC determination to obtain reception data. On the other hand, if determining that an ACK/NACK is included, the PUSCH demodulation unit 111 separates a data signal and the ACK/NACK from each other, outputs the ACK/NACK signal to the ACK/NACK decoding unit 114, and performs the above processes on the data signal to obtain reception data.

The PUCCH extraction unit 112 extracts a PUCCH from the signal received from the FFT unit 110 and outputs the extracted PUCCH to the PUCCH demodulation unit 113.

The PUCCH demodulation unit 113 demodulates the PUCCH received from the PUCCH extraction unit 112. More specifically, the PUCCH demodulation unit 113 identifies, through blind detection such as a power determination, a resource (an ACK/NACK resource or an SR resource) used for transmitting the ACK/NACK. If determining that the ACK/NACK has been transmitted using an SR resource, the PUCCH demodulation unit 113 determines that there is an SR and outputs the ACK/NACK to the ACK/NACK decoding unit 114. In addition, if determining that the ACK/NACK has been transmitted using an ACK/NACK resource, the PUCCH demodulation unit 113 determines that there is no SR and outputs the ACK/NACK to the ACK/NACK decoding unit 114. In addition, if determining that only an SR has been transmitted using an SR resource, the PUCCH demodulation unit 113 determines that there is an SR.

The ACK/NACK decoding unit 114 performs a decoding process on the ACK/NACK received from the PUSCH demodulation unit 111 or the PUCCH demodulation unit 113 to obtain a reception ACK/NACK (an ACK or a NACK). The obtained reception ACK/NACK is used by a retransmission control unit (not illustrated) to determine whether to retransmit a corresponding downlink data signal or transmit new data.

Configuration of Terminal

Figure 9:
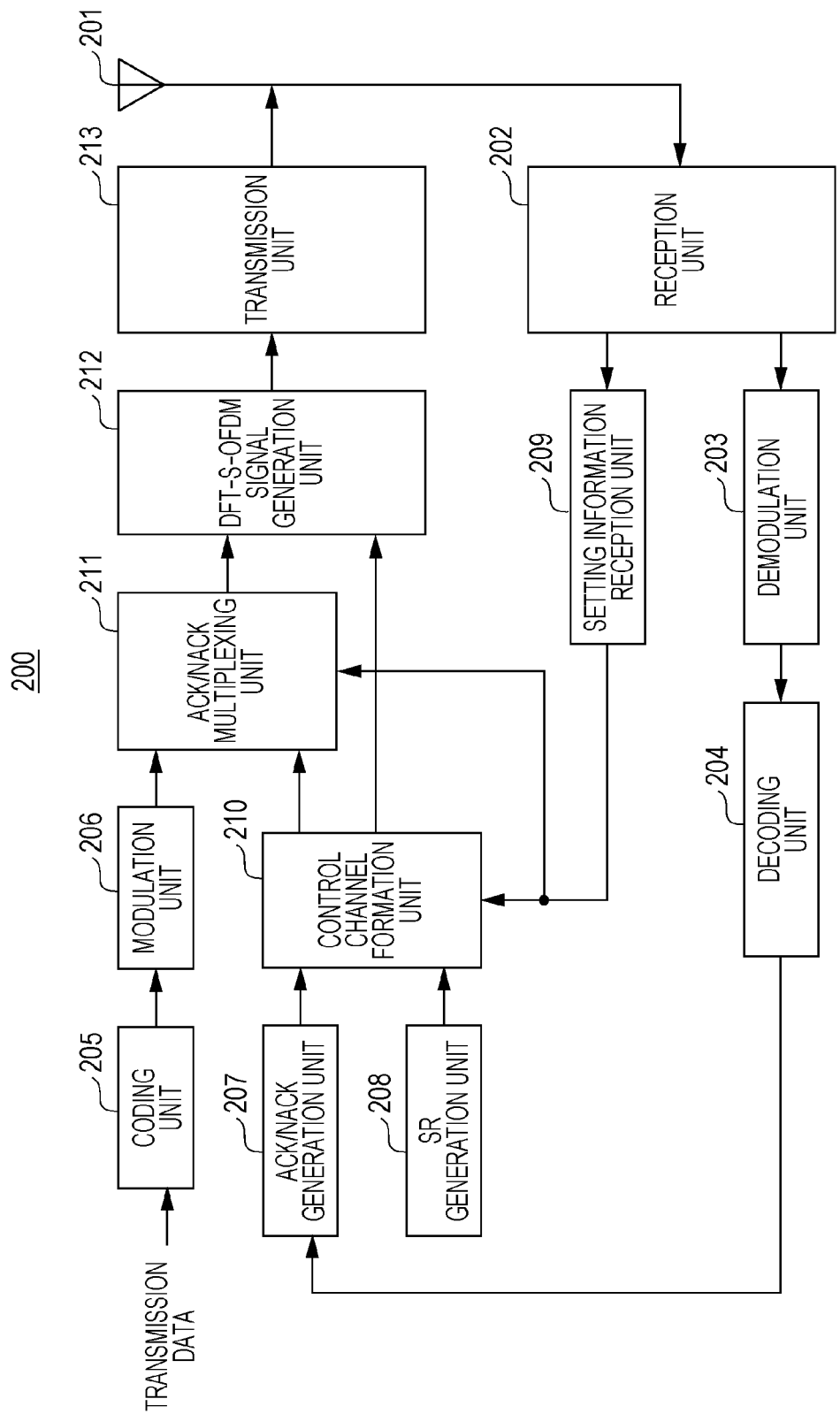
FIG. 9 illustrates the configuration of the terminal according to the first embodiment of the present disclosure.

FIG. 9 is a block diagram illustrating the configuration of the terminal 200 according to the first embodiment of the present disclosure. In FIG. 9, the terminal 200 includes an antenna 201, a reception unit 202, a demodulation unit 203, a decoding unit 204, a coding unit 205, a modulation unit 206, an ACK/NACK generation unit 207, an SR generation unit 208, the setting information reception unit 209, a control channel formation unit 210, an ACK/NACK multiplexing unit 211, a DFT-S-OFDM signal generation unit 212, and the transmission unit 213.

The reception unit 202 performs an RF process such as down-conversion or AD conversion on a radio signal received from the base station 100 through the antenna 201 to obtain a baseband OFDM signal. The reception unit 202 outputs the OFDM signal to the demodulation unit 203. In addition, the reception unit 202 outputs a PDCCH including timing information for identifying start positions of a plurality of consecutive subframes used for repetition transmission of at least two of an ACK/NACK, an SR, and a PUSCH in the OFDM signal or a higher layer control signal to the setting information reception unit 209.

The demodulation unit 203 performs a demodulation process on the OFDM signal received from the reception unit 202, extracts data (downlink data signal), and outputs the data to the decoding unit 204.

The decoding unit 204 performs an error correction process such as turbo decoding and an error detection process such as a cyclic redundancy check (CRC) determination on the data received from the demodulation unit 203. The decoding unit 204 outputs an obtained result of the error detection to the ACK/NACK generation unit 207.

The coding unit 205 performs error correction coding such as turbo coding on transmission data (a bit sequence, that is, an uplink data signal) and outputs a resultant coded bit sequence to the modulation unit 206.

The modulation unit 206 performs a data modulation process on the coded bit sequence received from the coding unit 205 and outputs a resultant data modulation signal to the ACK/NACK multiplexing unit 211.

The ACK/NACK generation unit 207 generates an ACK/NACK on the basis of the result of the error detection received from the decoding unit 204. More specifically, if an error is detected, the ACK/NACK generation unit 207 generates an ACK, and if an error is not detected, the ACK/NACK generation unit 207 generates a NACK. The ACK/NACK generation unit 207 outputs the generated ACK/NACK to the control channel formation unit 210.

If a scheduling request to the base station 100 occurs, the SR generation unit 208 generates an SR signal and outputs the SR signal to the control channel formation unit 210.

The setting information reception unit 209 reads the timing information received from the reception unit 202. The setting information reception unit 209 then sets, in accordance with read transmission timings, subframes (start positions) at which repetition transmission of at least two of an ACK/NACK, an SR, and a PUSCH starts and outputs the subframes to the control channel formation unit 210 and the ACK/NACK multiplexing unit 211.

The control channel formation unit 210 secures certain PUCCH transmission resources and identifies in advance the timings (subframes that are candidates for start positions) of repetition transmission of an ACK/NACK and an SR received from the setting information reception unit 209. The control channel formation unit 210 forms a PUCCH for transmitting control information including an ACK/NACK and/or an SR using a certain format in accordance with the timings of repetition transmission of an ACK/NACK and an SR received from the setting information reception unit 209 depending on cases such as independent transmission of an ACK/NACK, independent transmission of an SR, and simultaneous transmission of an ACK/NACK and an SR. In addition, if transmission of an ACK/NACK and transmission of a PUSCH (uplink data signal) occur in the same subframe, the control channel formation unit 210 outputs the ACK/NACK to the ACK/NACK multiplexing unit 211 without including the ACK/NACK in a PUCCH. The control channel formation unit 210 outputs the formed PUCCH to the DFT-S-OFDM signal generation unit 212.

The ACK/NACK multiplexing unit 211 identifies in advance the timings (subframes that are candidates for start positions) of repetition transmission of an ACK/NACK and a PUSCH received from the setting information reception unit 209. The ACK/NACK multiplexing unit 211 forms a PUSCH on the basis of a certain format in accordance with the timings of repetition transmission of an ACK/NACK and a PUSCH received from the setting information reception unit 209 depending on cases such as independent transmission of data and simultaneous transmission of an ACK/NACK and data. The ACK/NACK multiplexing unit 211 outputs the formed PUSCH to the DFT-S-OFDM signal generation unit 212.

The DFT-S-OFDM signal generation unit 212 performs a DFT process, subcarrier mapping, and an IFFT process on the PUCCH received from the control channel formation unit 210 or the PUSCH received from the ACK/NACK multiplexing unit 211 to generate a time-domain DFT-S-OFDM signal. The DFT-S-OFDM signal generation unit 212 outputs the generated DFT-S-OFDM signal to the transmission unit 213.

The transmission unit 213 performs an RF process such as D/A conversion or up-conversion on the DFT-S-OFDM signal received from the DFT-S-OFDM signal generation unit 212 and transmits a radio signal to the base station 100 through the antenna 201. In doing so, at least two of an ACK/NACK, an SR, and a PUSCH are repeatedly transmitted using a plurality of consecutive subframes starting from a start position of the repetition transmission read by the setting information reception unit 209.

Operation of Base Station 100 and Terminal 200

The operation of the base station 100 and the terminal 200 having the above configurations will be described. It is to be noted that ACK/NACK repetition transmission and SR repetition transmission through the PUCCH will be described hereinafter.

In the following description, the number of repetitions of an ACK/NACK and the number of repetitions of an SR are the same.

The base station 100 sets, for the terminal 200, subframes (candidates for start positions) at which the ACK/NACK repetition transmission starts and subframes (candidates for start positions) at which the SR repetition transmission starts. More specifically, the base station 100 matches the start positions of the SR repetition transmission with the start positions of the ACK/NACK repetition transmission. That is, the base station 100 sets each of the start positions of the SR repetition transmission to the same subframe for one of the start positions of the ACK/NACK repetition transmission. It is to be noted that the base station 100 may set the start positions of the SR repetition transmission to the same subframes for all the start positions of the ACK/NACK repetition transmission.

The base station 100 (setting unit 101) then transmits timing information for identifying the set start positions of the ACK/NACK repetition transmission and the set start positions of the SR repetition transmission to the terminal 200, for example, through higher layer signaling.

For example, the base station 100 performs assignment (e.g., DL assignment) of a downlink data signal corresponding to an ACK/NACK. The terminal 200 can identify a subframe a certain number of subframes after a subframe in which the assignment of the downlink data signal has been received as a transmission timing of the ACK/NACK for the downlink data signal. As the timing information, therefore, existing control information indicating the assignment of the downlink data signal may be used, instead. In this case, the terminal 200 may identify the start positions of the ACK/NACK repetition transmission on the basis of the timing information (the assignment of the downlink data signal: the existing control information) and set part or all of the start positions of the ACK/NACK repetition transmission as the start positions of the SR repetition transmission. The signaling for setting the start positions of the SR repetition transmission, therefore, becomes unnecessary.

Alternatively, the base station 100 may set the start positions of the SR repetition transmission and transmit timing information indicating the setting to the terminal 200. In this case, the terminal 200 may set the transmitted start positions of the SR repetition transmission as the start positions of the ACK/NACK repetition transmission. Alternatively, the base station 100 may set arbitrary subframes as the start positions of the ACK/NACK and SR repetition transmission and transmit timing information indicating the setting to the terminal 200.

The terminal 200 (setting information reception unit 209) receives the timing information transmitted from the base station 100 and sets the start positions (subframes) of the ACK/NACK and SR repetition transmission. The terminal 200 (transmission unit 213) then repeatedly transmits an ACK/NACK using consecutive subframes, which correspond to a certain number of repetitions, starting with a subframe that is a start position of the ACK/NACK repetition transmission and an SR using consecutive subframes, which correspond to a certain number of repetitions, starting with a subframe that is a start position of the SR repetition transmission.

Figure 10:
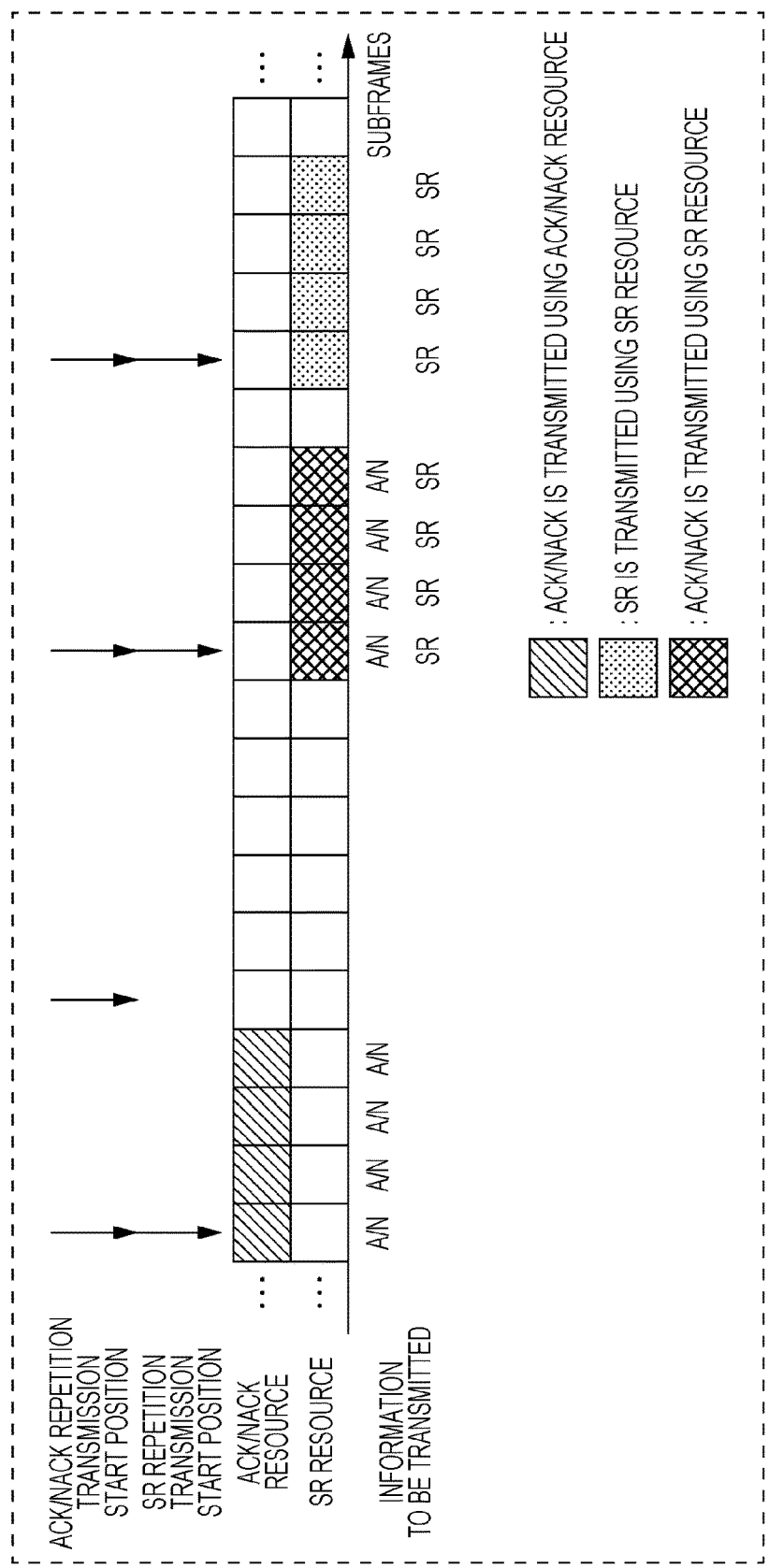
FIG. 10 illustrates timings of repetition transmission of an ACK/NACK and an SR according to the first embodiment of the present disclosure.

FIG. 10 illustrates an example of transmission timings of ACK/NACKs and SRs. It is to be noted that in FIG. 10, the number of repetitions of an ACK/NACK and an SR is four (four subframes) each.

As illustrated in FIG. 10, in a subframe in which only an ACK/NACK is transmitted, the terminal 200 transmits the ACK/NACK using an ACK/NACK resource. In addition, in a subframe in which only an SR is transmitted, the terminal 200 transmits the SR using an SR resource.

In addition, as illustrated in FIG. 10, if ACK/NACK repetition transmission and SR repetition transmission occur in the same subframes, the terminal 200 transmits ACK/NACKs using SR resources.

Here, the terminal 200 (setting information reception unit 209) sets each of start positions of the SR repetition transmission to the same subframe for one of start positions of the ACK/NACK repetition transmission. That is, as illustrated in FIG. 10, the start positions of the SR repetition transmission are at least the same as the start positions of the ACK/NACK repetition transmission.

In addition, as illustrated in FIG. 10, the number of repetitions of an ACK/NACK and an SR is the same, namely four subframes.

If ACK/NACK repetition transmission and SR repetition transmission occur in the same subframes, therefore, subframes used for the ACK/NACK repetition transmission and subframes used for the SR repetition transmission are the same. That is, if ACK/NACK repetition transmission and SR repetition transmission occur in the same subframes, the terminal 200 transmits ACK/NACKs using SR resources in all subframes in a period of the ACK/NACK and SR repetition transmission. In other words, in consecutive subframes (four consecutive subframes in FIG. 10) in a period of the SR repetition transmission, resources used for transmitting the ACK/NACKs do not switch in midstream as in FIGS. 4A and 4B.

As described above, according to the present embodiment, since the resources for transmitting the ACK/NACKs do not change in the period of the SR repetition transmission as in FIG. 4B, the base station 100 can decode the ACK/NACKs after receiving all of repeatedly transmitted SRs and determining whether the SRs have been transmitted. As a result, deterioration of the ACK/NACK decoding properties can be avoided.

Furthermore, according to the present embodiment, since the resources used for transmitting the ACK/NACKs do not change in the period of the SR repetition transmission, a signal point of the SR resources does not change during the SR repetition transmission. In-phase combination can therefore be performed at a time of detection of the SRs, thereby improving the SR detection properties.

In addition, if ACK/NACK repetition transmission and SR repetition transmission occur in the same subframes, the terminal 200 transmits ACK/NACKs using SR resources in all subframes in a period of the SR repetition transmission. As a result, according to the present embodiment, an SR need not be dropped if an ACK/NACK and the SR occur in the same subframe as in FIG. 4A, thereby avoiding deterioration of SR detection properties.

In addition, according to the present embodiment, a case in which "ACK/NACK repetition transmission occurs during SR repetition transmission" does not occur, and, as in the above case, deterioration of the SR detection properties due to lack of in-phase combination at the time of the detection of SRs can be avoided.

Second Embodiment

In the first embodiment, the ACK/NACK repetition transmission and the SR repetition transmission through the PUCCH have been described. In the present embodiment, ACK/NACK repetition transmission and PUSCH repetition transmission through the PUSCH will be described.

It is to be noted that basic configurations of a base station and a terminal according to the present embodiment are the same as those according to the first embodiment and will be described with reference to FIG. 8 (base station 100) and FIG. 9 (terminal 200).

In the following description, as in the first embodiment, the number of repetitions of an ACK/NACK and the number of repetitions of a PUSCH are the same.

The base station 100 sets, for the terminal 200, subframes (candidates for start positions) at which the ACK/NACK repetition transmission starts and subframes (candidates for start positions) at which the PUSCH repetition transmission starts. The base station 100, for example, sets the start positions of the ACK/NACK repetition transmission to the same subframes for the start positions of the PUSCH repetition transmission. Alternatively, the base station 100 may set each of the start positions of the ACK/NACK repetition transmission to one of the start positions of the PUSCH repetition transmission, or may set each of the start positions of the PUSCH repetition transmission to one of the start positions of the ACK/NACK repetition transmission.

The base station 100 (setting unit 101) then transmits timing information for identifying the set start positions of the ACK/NACK repetition transmission and the set start positions of the PUSCH repetition transmission to the terminal 200, for example, through higher layer signaling.

For example, the base station 100 performs assignment (UL grant) of an uplink data signal using a downlink control channel (PDCCH) to the terminal 200. That is, the terminal 200 can identify a transmission timing of the uplink data signal on the basis of the assignment of the uplink data signal. As the timing information, therefore, existing control information indicating the assignment of the uplink data signal may be used, instead. In this case, the terminal 200 (setting information reception unit 209) may identify the start positions of the PUSCH repetition transmission on the basis of the timing information (the assignment of the uplink data signal: the existing control information) and set part or all of the start positions of the PUSCH repetition transmission as the start positions of the ACK/NACK repetition transmission. The signaling for setting the start positions of the ACK/NACK repetition transmission, therefore, becomes unnecessary.

Alternatively, the base station 100 may set arbitrary subframes as the start positions of the PUSCH and ACK/NACK repetition transmission and transmit timing information indicating the setting to the terminal 200.

The terminal 200 (setting information reception unit 209) sets the start positions (subframes) of the ACK/NACK and PUSCH repetition transmission on the basis of the timing information transmitted from the base station 100. The terminal 200 (transmission unit 213) then repeatedly transmits an ACK/NACK using consecutive subframes, which correspond to a certain number of repetitions, starting with a subframe that is a start position of the ACK/NACK repetition transmission and a PUSCH using consecutive subframes, which correspond to a certain number of repetitions, starting with a subframe that is a start position of the PUSCH repetition transmission.

Figure 11:
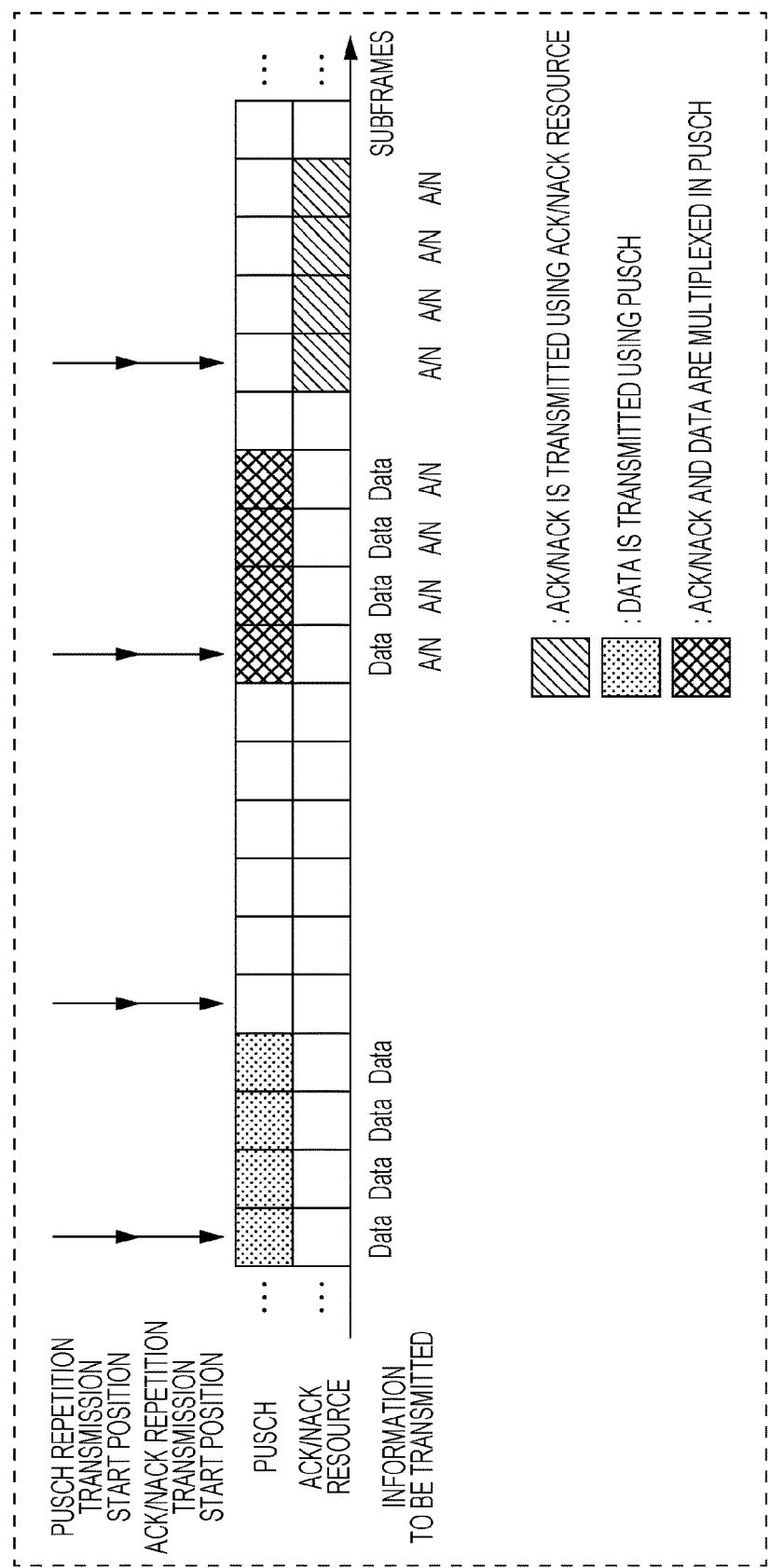
FIG. 11 illustrates timings of repetition transmission of an ACK/NACK and data according to a second embodiment of the present disclosure.

FIG. 11 illustrates an example of transmission timings of ACK/NACKs and PUSCHs. It is to be noted that in FIG. 11, the number of repetitions of an ACK/NACK and a PUSCH is four (four subframes) each.

As illustrated in FIG. 11, in a subframe in which only an ACK/NACK is transmitted, the terminal 200 transmits the ACK/NACK using an ACK/NACK resource. In addition, in a subframe in which only data is transmitted, the terminal 200 transmits the data using a PUSCH.

In addition, as illustrated in FIG. 11, if ACK/NACK repetition transmission and PUSCH repetition transmission occur in the same subframes, the terminal 200 time-multiplexes and transmits ACK/NACKs and data in the PUSCH.

Here, the terminal 200 (setting information reception unit 209) sets start positions of the ACK/NACK repetition transmission to the same subframe for start positions of the PUSCH repetition transmission. That is, as illustrated in FIG. 11, the start positions of the ACK/NACK repetition transmission are the same as the start positions of the PUSCH repetition transmission.

In addition, as illustrated in FIG. 11, the number of repetitions of an ACK/NACK and a PUSCH is the same, namely four subframes.

If ACK/NACK repetition transmission and PUSCH repetition transmission occur in the same subframes, therefore, subframes used for repeatedly transmitting the ACK/NACK and subframes used for repeatedly transmitting the PUSCH are the same. That is, if ACK/NACK repetition transmission and PUSCH repetition transmission occur in the same subframes, the terminal 200 time-multiplexes and transmits the ACK/NACKs and the data using PUSCHs in all subframes in a period of the ACK/NACK and data repetition transmission. In other words, in consecutive subframes (four consecutive subframes in FIG. 11) in a period of the PUSCH repetition transmission, resources used for transmitting the ACK/NACKs do not switch or a signal in a PUSCH in the period of the ACK/NACK repetition transmission does not change as in FIG. 5.

As described above, according to the present embodiment, since the signal repeatedly transmitted in the PUSCH does not change in the period of the ACK/NACK repetition transmission as in FIG. 5, the base station 100 can determine whether ACK/NACKs are included in PUSCHs after receiving a PUSCH repetition including data and an ACK/NACK the number of times of ACK/NACK repetitions. As a result, deterioration of the ACK/NACK decoding properties is likely to be avoided.

In addition, according to the present embodiment, a case in which "PUSCH repetition transmission occurs during ACK/NACK repetition transmission" does not occur, and, as in the above case, deterioration of the ACK/NACK decoding properties is likely to be avoided.

Third Embodiment

In the present embodiment, a case will be described in which start positions of ACK/NACK repetition transmission and SR repetition transmission in the PUCCH are periodically set.

It is to be noted that basic configurations of a base station and a terminal according to the present embodiment are the same as those according to the first embodiment and will be described with reference to FIG. 8 (base station 100) and FIG. 9 (terminal 200).

In the following description, as in the first embodiment, the number of repetitions of an ACK/NACK and the number of repetitions of a SR are the same.

The base station 100 and the terminal 200 periodically set the start positions (subframes) of the ACK/NACK repetition transmission and the start positions (subframes) of the SR repetition transmission. The base station 100 and the terminal 200, for example, set a period of the start positions of the SR repetition transmission to an integral multiple of a period of the start positions of the ACK/NACK repetition transmission. Alternatively, the period of the start positions of the SR repetition transmission and the period of the start positions of the ACK/NACK repetition transmission may be the same.

In addition, as in the first embodiment, the base station 100 and the terminal 200 match the start positions (subframes) of the SR repetition transmission with the start positions of the ACK/NACK repetition transmission. In addition, as in the first embodiment, if the ACK/NACK and SR transmission is in the same subframes, the terminal 200 transmits ACK/NACKs using SR resources.

Figure 12:
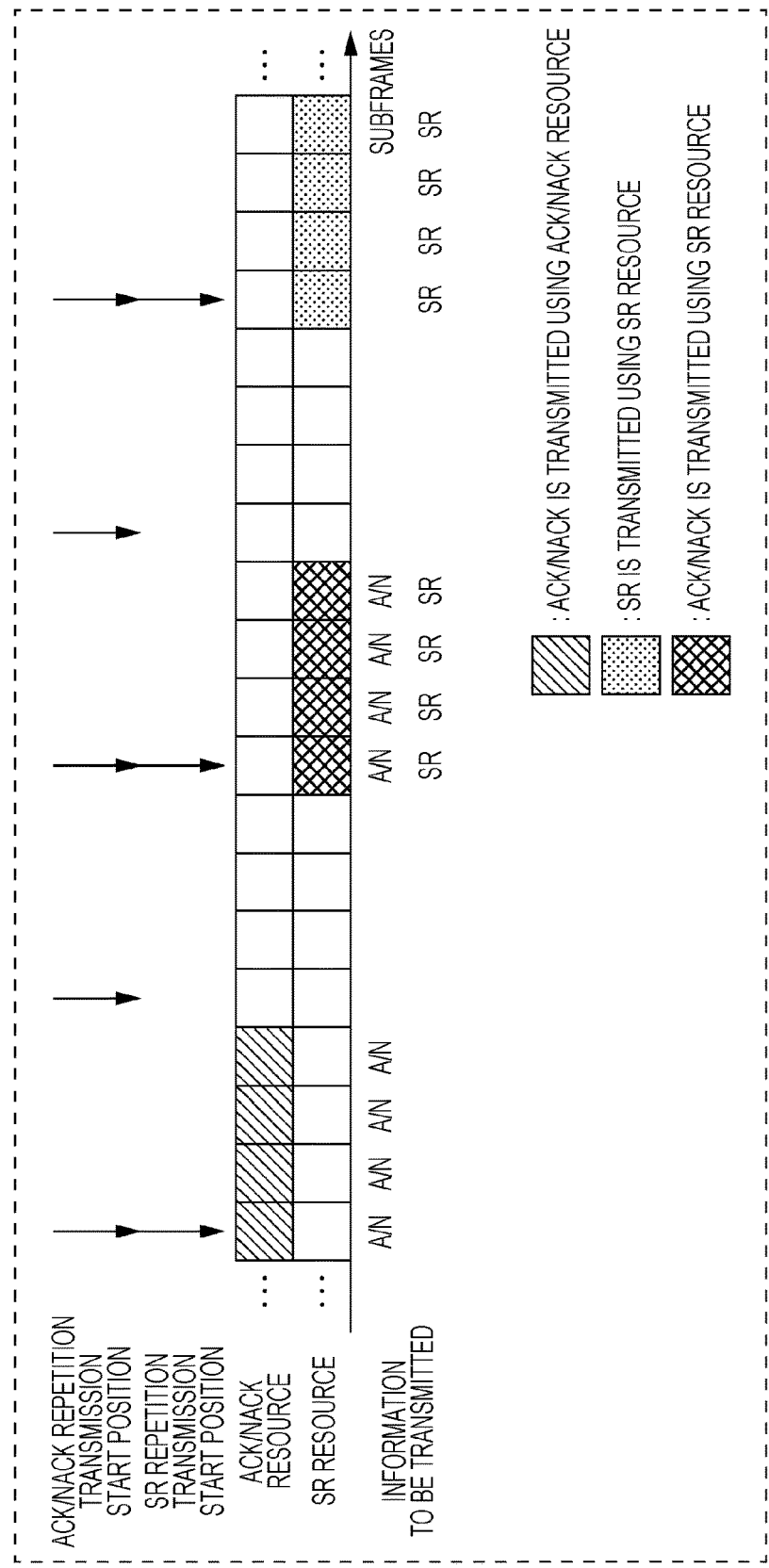
FIG. 12 illustrates timings of repetition transmission of an ACK/NACK and an SR according to a third embodiment of the present disclosure.

FIG. 12 illustrates an example of transmission timings of ACK/NACKs and SRs according to the present embodiment.

In FIG. 12, the number of repetitions of an ACK/NACK and an SR is four each.

In addition, as illustrated in FIG. 12, the period of the start positions of the ACK/NACK repetition transmission is four subframes (that is, 4 ms), and the period of the start positions of the SR repetition transmission is eight subframes (that is, 8 ms). That is, the period of the start positions of the SR repetition transmission is twice (an integral multiple of) the period of the start positions of the ACK/NACK repetition transmission.

In addition, as illustrated in FIG. 12, the start positions (subframes) of the SR repetition transmission are matched with the start positions of the ACK/NACK repetition transmission as in the first embodiment. That is, each of the subframes that are the start positions of the SR repetition transmission is the same as one of the subframes that are the start positions of the ACK/NACK repetition transmission. In addition, as illustrated in FIG. 12, if the ACK/NACK and SR transmission is in the same subframes, ACK/NACKs are transmitted using SR resources as in the first embodiment.

The above-described start positions of the ACK/NACK repetition transmission are represented as subframes that satisfy the following expression.

[Math. 1]

$$(10 \times n_f + \lfloor n_s/2 \rfloor) \bmod N_{ACK/NACK} = 0 \quad (1)$$

In Expression (1), $n_f$ denotes a system frame number, $n_s$ denotes a slot number in a frame, and $N_{ACK/NACK}$ denotes the number of ACK/NACK repetitions in the PUCCH. $N_{ACK/NACK}$ is transmitted from the base station 100 to the terminal 200 in advance, for example, as timing information. That is, the terminal 200 (setting information reception unit 209) sets the start positions of the ACK/NACK repetition transmission in accordance with Expression (1) using the timing information transmitted from the base station 100.

On the other hand, the above-described start positions of the SR repetition transmission are represented as subframes that satisfy the following expression.

[Math. 2]

$$(10 \times n_f + \lfloor n_s/2 \rfloor - N_{OFFSET,SR}^{enhanced}) \bmod SR_{PERIODICITY}^{enhanced} = 0 \quad (2)$$

$SR_{PERIODICITY}^{enhanced}$ and $N_{OFFSET,SR}^{enhanced}$ in Expression (2), however, are given in accordance with the following expression.

[Math. 3]

$$\begin{cases} SR_{PERIODICITY}^{enhanced} = N_{SR} SR_{PERIODICITY} \\ N_{OFFSET,SR}^{enhanced} = N_{SR} N_{OFFSET,SR} \end{cases} \quad (3)$$

In Expression (3), $N_{SR}$ denotes the number of SR repetitions, and $N_{ACK/NACK} = N_{SR}$ in the present embodiment. In addition, $SR_{PERIODICITY}$ and $N_{OFFSET,SR}$ are defined by a table illustrated in FIG. 13 and calculated by a parameter $I_{SR}$ transmitted from the base station 100 to the terminal 200. That is, the terminal 200 (setting information reception unit 209) sets the start positions of the SR repetition transmission in accordance with the table illustrated in FIG. 13 and Expressions (2) and (3) using $I_{SR}$ and $N_{ACK/NACK}$ (=$N_{SR}$) indicated in the timing information transmitted from the base station 100.

FIG. 12, for example, illustrates an example in which the base station 100 transmits $N_{ACK/NACK} = N_{SR} = 4$ and $I_{SR} = 155$ to the terminal 200. That is, since $N_{SR} = N_{ACK/NACK}$ and, as illustrated in FIG. 13, $SR_{PERIODICITY}$ is an integer, $SR_{PERIODICITY}^{enhanced}$ (=$SR_{PERIODICITY} N_{SR}$) in Expression (2), which denotes the period of the start positions of the SR repetition transmission, is an integral multiple of $N_{ACK/NACK}$, which denotes the period of the start positions of the ACK/NACK repetition transmission.

In the present embodiment, if there is an ACK/NACK to be transmitted in a subframe that is a start position of the ACK/NACK repetition transmission, the terminal 200 transmits the ACK/NACK using $N_{ACK/NACK}$ consecutive subframes starting with the subframe that is the start position of the ACK/NACK repetition transmission. In addition, if there is an SR to be transmitted in a subframe that is a start position of the SR repetition transmission, the terminal 200 transmits the SR using $N_{SR}$ consecutive subframes starting with the subframe that is the start position of the SR repetition transmission.

At this time, as in the first embodiment, the terminal 200 transmits ACK/NACKs using ACK/NACK resources in subframes in which ACK/NACK repetitions are independently transmitted. In addition, the terminal 200 transmits SRs using SR resources in subframes in which SR repetitions are independently transmitted. On the other hand, the terminal 200 transmits ACK/NACKs using SR resources in subframes in which SR repetitions and ACK/NACK repetitions are simultaneously transmitted.

In doing so, as in the first embodiment, the start positions of the SR repetition transmission are matched with the start positions of the ACK/NACK repetition transmission. That is, the SR repetition transmission does not occur during the ACK/NACK repetition transmission, or the ACK/NACK repetition transmission does not occur in the period of the SR repetition transmission. Resources used for transmitting ACK/NACKs therefore do not change during the SR repetition transmission. The base station 100 can thus decode the ACK/NACKs after receiving all of repeatedly transmitted SRs and determining whether the SRs have been transmitted. As a result, deterioration of the ACK/NACK decoding properties can be avoided.

Furthermore, as in the first embodiment, since the resources used for transmitting the ACK/NACKs do not change in the period of the SR repetition transmission, a signal point of the SR resources does not change during the SR repetition transmission. In-phase combination can therefore be performed at a time of detection of the SRs, thereby improving the SR detection properties.

In addition, as in the first embodiment, if ACK/NACK repetition transmission and SR repetition transmission occur in the same subframes, the terminal 200 transmits ACK/NACKs using SR resources in all subframes in a period of the SR repetition transmission. As a result, an SR need not be dropped if an ACK/NACK and the SR occur in the same subframe as in FIG. 4A, thereby avoiding deterioration of the SR detection properties.

In addition, as in the first embodiment, a case in which "ACK/NACK repetition transmission occurs during SR repetition transmission" does not occur, and, as in the above case, deterioration of the SR detection properties due to lack of in-phase combination at the detection of SRs can be avoided.

Furthermore, in the present embodiment, since the start positions of the ACK/NACK repetition transmission are set to predetermined periodical subframes, the system can be easily controlled in terms of the ACK/NACK repetition transmission.

In addition, in the present embodiment, since the period of the start positions of the SR repetition transmission is set to an integral multiple of the period of the start positions of the ACK/NACK repetition transmission, the base station 100 can easily notify the terminal 200 of the start positions (subframes and a period) of the repetition transmission. In the present embodiment, for example, the terminal 200 can identify the period $N_{SR} N_{ACK/NACK}$ of the start positions of the SR repetition transmission on the basis of the period $N_{ACK/NACK}$ of the start positions of the ACK/NACK repetition transmission. In addition, the terminal 200 can calculate (Expressions (2) and (3)) the start positions of the repetition transmission using the existing correspondence table (FIG. 13) just by receiving $N_{ACK/NACK}$ (=$N_{SR}$) and $I_{SR}$ from the base station 100.

Fourth Embodiment

In the present embodiment, as in the third embodiment, a case will be described in which start positions of ACK/NACK repetition transmission and start positions of PUSCH repetition transmission in the PUSCH are periodically set.

It is to be noted that basic configurations of a base station and a terminal according to the present embodiment are the same as those according to the first embodiment and will be described with reference to FIG. 8 (base station 100) and FIG. 9 (terminal 200).

In the following description, as in the second embodiment, the number of repetitions of an ACK/NACK and the number of repetitions of a PUSCH are the same.

The base station 100 and the terminal 200 periodically set the start positions (subframes) of the ACK/NACK repetition transmission and the start positions (subframes) of the PUSCH repetition transmission. The base station 100 and the terminal 200, for example, set a period of the start positions of the ACK/NACK repetition transmission to be the same as a period of the start positions of the PUSCH repetition transmission. Alternatively, either of the period of the start positions of the ACK/NACK repetition transmission and the period of the start positions of the PUSCH repetition transmission may be an integral multiple of the other.

In addition, as in the second embodiment, the base station 100 and the terminal 200 match the start positions (subframes) of the ACK/NACK repetition transmission with the start positions of the PUSCH repetition transmission. In addition, as in the second embodiment, if the ACK/NACK and PUSCH transmission is in the same subframes, the terminal 200 time-multiplexes and transmits ACK/NACKs and PUSCHs in the PUSCH.

Figure 14:
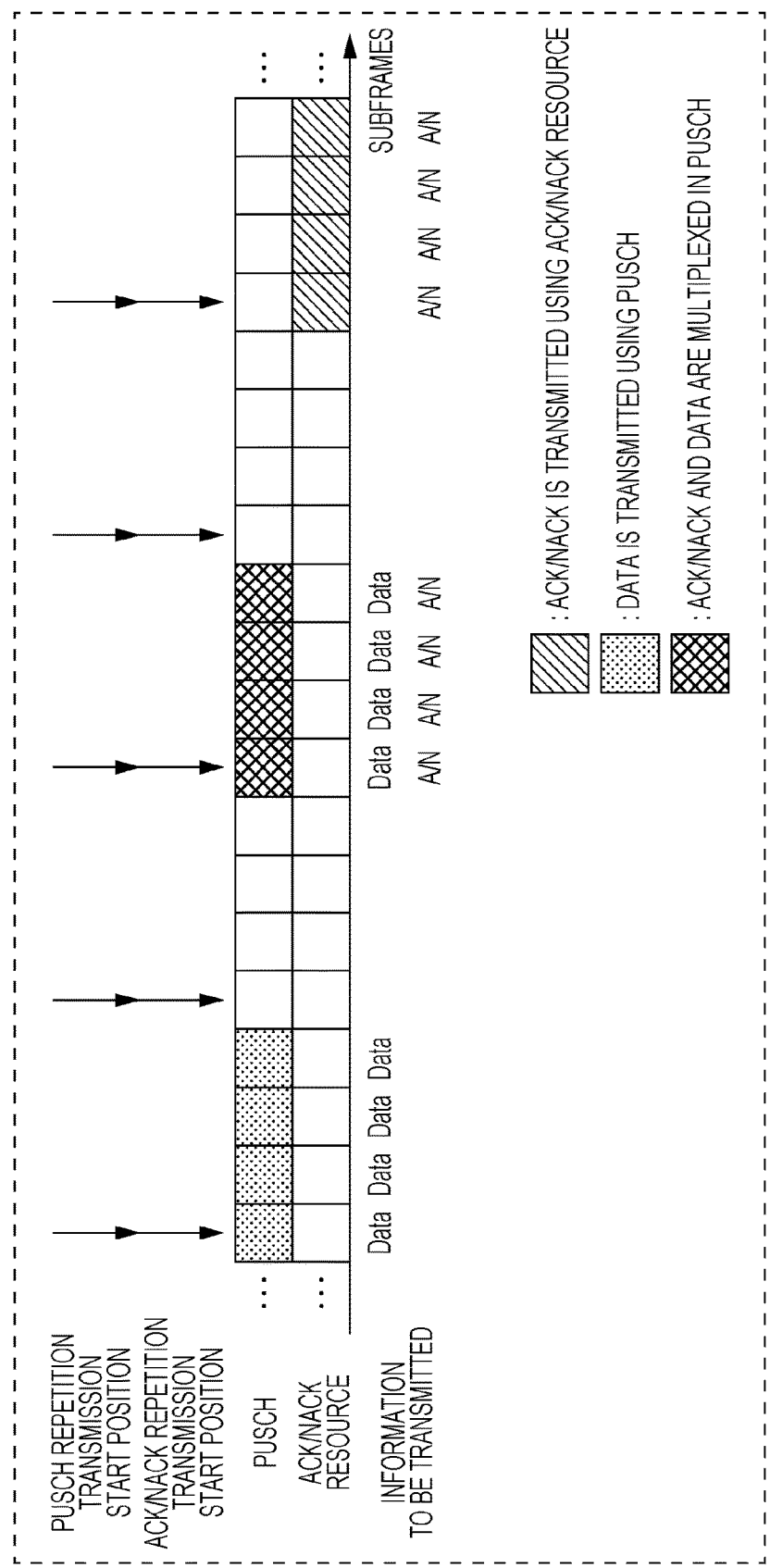
FIG. 14 illustrates timings of repetition transmission of an ACK/NACK and data according to a fourth embodiment of the present disclosure.

FIG. 14 illustrates an example of transmission timings of ACK/NACKs and PUSCHs according to the present embodiment.

In FIG. 14, the number of repetitions of an ACK/NACK and a PUSCH is four each.

In addition, as illustrated in FIG. 14, the period of the start positions of the PUSCH repetition transmission is four subframes (that is, 4 ms), and the period of the start positions of the ACK/NACK repetition transmission, too, is four subframes (that is, 4 ms). That is, the period of the start positions of the ACK/NACK repetition transmission is the same as the period of the start positions of the PUSCH repetition transmission.

In addition, as illustrated in FIG. 14, the start positions (subframes) of the ACK/NACK repetition transmission are matched with the start positions of the PUSCH repetition transmission as in the second embodiment. That is, the subframes that are the start positions of the ACK/NACK repetition transmission are the same as the subframes that are the start positions of the PUSCH repetition transmission. In addition, as illustrated in FIG. 14, if the ACK/NACK and PUSCH transmission is in the same subframes, ACK/NACKs and PUSCHs are time-multiplexed and transmitted in the PUSCH as in the second embodiment. A method for multiplexing data and ACK/NACKs in the same subframes of the PUSCH is the same as a conventional one.

The above-described start positions of the ACK/NACK repetition transmission are represented as subframes that satisfy the following expression.

[Math. 4]

$$(10 \times n_f + \lfloor n_s/2 \rfloor) \bmod N_{ACK/NACK} = 0 \qquad (4)$$

In Expression (4), $n_f$ denotes a system frame number, $n_s$ denotes a slot number in a frame, and $N_{ACK/NACK}$ denotes the number of ACK/NACK repetitions in the PUCCH. $N_{ACK/NACK}$ is transmitted from the base station 100 to the terminal 200 in advance, for example, as timing information. That is, the terminal 200 (setting information reception unit 209) sets the start positions of the ACK/NACK repetition transmission in accordance with Expression (4) using the timing information transmitted from the base station 100.

On the other hand, the above-described start positions of the PUSCH repetition transmission are represented as subframes that satisfy the following expression.

[Math. 5]

$$(10 \times n_f + \lfloor n_s/2 \rfloor) \bmod N_{PUSCH} = 0 \qquad (5)$$

In Expression (5), $N_{PUSCH}$ denotes the number of PUSCH repetitions, and $N_{PUSCH} = N_{ACK/NACK}$ in the present embodiment. That is, the terminal 200 (setting information reception unit 209) can set the start positions of the PUSCH repetition transmission in accordance with Expression (5) using the timing information ($N_{ACK/NACK}$ (=$N_{PUSCH}$)) regarding the ACK/NACK repetition transmission transmitted from the base station 100.

FIG. 14, for example, illustrates an example in which the base station 100 transmits $N_{PUSCH} = N_{ACK/NACK} = 4$ to the terminal 200.

In the present embodiment, if there is an ACK/NACK to be transmitted in a subframe that is a start position of the ACK/NACK repetition transmission, the terminal 200 transmits the ACK/NACK using $N_{ACK/NACK}$ consecutive subframes starting with the subframe that is the start position of the ACK/NACK repetition transmission. In addition, if there is data to be transmitted in a subframe that is a start position of the PUSCH repetition transmission, the terminal 200 transmits the data using $N_{PUSCH}$ consecutive subframes starting with the subframe that is the start position of the PUSCH repetition transmission.

At this time, as in the second embodiment, the terminal 200 transmits ACK/NACKs using ACK/NACK resources in subframes in which ACK/NACK repetitions are independently transmitted. In addition, the terminal 200 transmits data using PUSCHs in subframes in which PUSCH repetitions are independently transmitted. On the other hand, the terminal 200 time-multiplexes and transmits ACK/NACKs and data in the PUSCH in subframes in which PUSCH repetitions and ACK/NACK repetitions are simultaneously transmitted.

In doing so, as in the second embodiment, the ACK/NACK repetition transmission does not occur during the PUSCH repetition transmission, and a signal in the PUSCH does not change in a period of the PUSCH repetition transmission. The base station 100 can therefore determine whether ACK/NACKs are included in PUSCHs after receiving a PUSCH repetition including data and an ACK/NACKs the number of times of ACK/NACK repetitions. As a result, deterioration of the ACK/NACK decoding properties is likely to be avoided.

In addition, according to the present embodiment, a case in which "PUSCH repetition transmission occurs during ACK/NACK repetition transmission" does not occur, and, as in the above case, deterioration of the ACK/NACK decoding properties is likely to be avoided.

Furthermore, in the present embodiment, since the start positions of the ACK/NACK repetition transmission and the PUSCH repetition transmission are set to predetermined periodical subframes, the system can be easily controlled in terms of the ACK/NACK repetition transmission and the PUSCH repetition transmission.

In addition, in the present embodiment, since the period of the start positions of the ACK/NACK repetition transmission is set to be the same as the period of the start positions of the PUSCH repetition transmission, the base station 100 can easily notify the terminal 200 of the start positions (subframes and a period) of the repetition transmission. In the present embodiment, for example, the terminal 200 can identify the period $N_{ACK/NACK}$ $N_{PUSCH}$) of the start positions of the ACK/NACK repetition transmission on the basis of the period $N_{PUSCH}$ of the start positions of the PUSCH repetition transmission.

Fifth Embodiment

In the first and third embodiments, cases in which the number of repetitions of an ACK/NACK and the number of repetitions of an SR in the PUCCH are the same have been described. The number of repetitions of an ACK/NACK and the number of repetitions of an SR in the PUCCH, however, are not necessarily the same. In the present embodiment, therefore, a case will be described in which the number of repetitions of an ACK/NACK and the number of repetitions of an SR in the PUCCH are different from each other.

It is to be noted that basic configurations of a base station and a terminal according to the present embodiment are the same as those according to the first embodiment and will be described with reference to FIG. 8 (base station 100) and FIG. 9 (terminal 200).

In FIG. 15, the number of repetitions of an ACK/NACK is four subframes, and the number of repetitions of an SR is eight subframes. That is, the number of repetitions of an SR is larger than the number of repetitions of an ACK/NACK.

As illustrated in FIG. 15, if ACK/NACK repetition transmission and SR repetition transmission occur in the same subframes, ACK/NACKs are transmitted using SR resources in subframes (first four subframes) in which the ACK/NACKs and SRs are transmitted, and SRs are transmitted using SR resources in other subframes (last four subframes) after completion of the ACK/NACK repetition transmission. That is, if the number of repetitions of an SR is larger than the number of repetitions of an ACK/NACK, a signal point of the SR resources might undesirably change in midstream in a period of the SR repetition transmission (eight subframes). If the signal point of the SR resources changes in midstream, in-phase combination cannot be performed at a time of detection of SRs, thereby deteriorating the SR detection properties.

In the present embodiment, therefore, a method will be described by which deterioration of the SR detection properties can be avoided even if the number of repetitions of an ACK/NACK and the number of repetitions of an SR in the PUCCH are different from each other, in addition to the operations according to the first embodiment.

More specifically, if ACK/NACK repetition transmission and SR repetition transmission occur in the same subframes, the terminal 200 according to the present embodiment sets the number of repetitions of an ACK/NACK in the PUCCH to the number of repetitions of an SR or the number of repetitions of an ACK/NACK, whichever is larger.

In the example illustrated in FIG. 15, for example, the number of repetitions of an ACK/NACK is four subframes, and the number of repetitions of an SR is eight subframes. That is, the predetermined number of SR repetitions (eight subframes) is larger than the predetermined number of ACK/NACK repetitions (four subframes). In this case, as illustrated in FIG. 16, if ACK/NACK repetition transmission and SR repetition transmission occur in the same subframes, the terminal 200 repeatedly transmits an ACK/NACK the same number of times (eight subframes) as the SR repetition transmission. That is, the number of repetitions of an ACK/NACK is set to the larger number (eight subframes) between the number of repetitions of an SR (eight subframes) and the number of repetitions of an ACK/NACK (four subframes).

In doing so, if ACK/NACK repetition transmission and SR repetition transmission simultaneously occur, ACK/NACKs are transmitted using SR resources in all subframes in a period of the SR repetition transmission. Since a signal point of the SR resources does not change in the period of the SR repetition transmission, the base station 100 can detect SRs through in-phase combination, and it is likely that deterioration of the SR detection properties can be avoided.

In addition, in FIG. 16, if ACK/NACK repetition transmission and SR repetition transmission simultaneously occur, the number of repetitions of an ACK/NACK is increased and becomes the same as the number of repetitions of an SR, and the ACK/NACK decoding properties in the base station 100 can be improved.

It is to be noted that in FIG. 16, a case in which the number of repetitions of an ACK/NACK is smaller than the number of repetitions of an SR has been described. On the other hand, if the predetermined number of repetitions of an ACK/NACK is larger than the predetermined number of repetitions of an SR, the terminal 200 uses the predetermined number of repetitions of an ACK/NACK. In doing so, even if ACK/NACK repetition transmission and SR repetition transmission simultaneously occur, ACK/NACKs are transmitted using SR resources at least in a period of the SR repetition transmission. A signal point of the SR resources therefore does not change in midstream, thereby avoiding deterioration of the SR detection properties. On the other hand, a resource used for transmitting an ACK/NACK in a period of the ACK/NACK repetition transmission switches from an SR resource to an ACK/NACK resource. Even if the resource used for transmitting an ACK/NACK changes halfway through the ACK/NACK repetition transmission, however, the base station 100 can decode the ACK/NACKs without deteriorating the ACK/NACK decoding properties using the ACK/NACKs transmitted using the SR resources in the period of the SR repetition transmission and the ACK/NACKs transmitted using the ACK/NACK resources in periods other than the period of the SR repetition transmission.

Sixth Embodiment

In the second and fourth embodiments, cases in which the number of repetitions of an ACK/NACK and the number of repetitions of a PUSCH (data) in the PUSCH are the same have been described. The number of repetitions of an ACK/NACK and the number of repetitions of data in the PUSCH, however, are not necessarily the same. In the present embodiment, therefore, as in the fifth embodiment, a case will be described in which the number of repetitions of an ACK/NACK and the number of repetitions of data in the PUSCH are different from each other.

It is to be noted that basic configurations of a base station and a terminal according to the present embodiment are the same as those according to the first embodiment and will be described with reference to FIG. 8 (base station 100) and FIG. 9 (terminal 200).

In FIG. 17, the number of repetitions of an ACK/NACK is four subframes, and the number of repetitions of a PUSCH (data) is eight subframes. That is, the number of repetitions of a PUSCH is larger than the number of repetitions of an ACK/NACK.

As illustrated in FIG. 17, if ACK/NACK repetition transmission and PUSCH repetition transmission occur in the same subframes, ACK/NACKs and data are time-multiplexed and transmitted in the PUSCH in subframes (first four subframes) in which the ACK/NACKs and the data are transmitted, and only data is transmitted in the PUSCH in other subframes (last four subframes) after completion of the ACK/NACK repetition transmission. That is, if the number of repetitions of a PUSCH is larger than the number of repetitions of an ACK/NACK, data content in the PUSCH might undesirably change in a period of the PUSCH repetition transmission (eight subframes). If the data content in the PUSCH changes in midstream, data decoding properties deteriorate, and the ACK/NACK decoding properties also deteriorate.

In the present embodiment, therefore, a method will be described by which deterioration of the data decoding properties and the ACK/NACK decoding properties can be avoided even if the number of repetitions of an ACK/NACK and the number of repetitions of data in the PUSCH are different from each other, in addition to the operations according to the second embodiment.

More specifically, if ACK/NACK repetition transmission and PUSCH repetition transmission occur in the same subframes, the terminal 200 according to the present embodiment sets the number of repetitions of an ACK/NACK in the PUSCH to the number of repetitions of a PUSCH or the number of repetitions of an ACK/NACK, whichever is larger.

In the example illustrated in FIG. 17, for example, the number of repetitions of an ACK/NACK is four subframes, and the number of repetitions of data is eight subframes. That is, the predetermined number of PUSCH repetitions (eight subframes) is larger than the predetermined number of ACK/NACK repetitions (four subframes). In this case, as illustrated in FIG. 18, if ACK/NACK repetition transmission and PUSCH repetition transmission occur in the same subframes, the terminal 200 repeatedly transmits an ACK/NACK the same number of times (eight subframes) as the PUSCH repetition transmission. That is, the number of repetitions of an ACK/NACK is set to the larger number (eight subframes) between the number of repetitions of a PUSCH (eight subframes) and the number of repetitions of an ACK/NACK (four subframes).

In doing so, if ACK/NACK repetition transmission and PUSCH repetition transmission simultaneously occur, ACK/NACKs and data are time-multiplexed and transmitted in the PUSCH in all subframes in a period of the PUSCH repetition transmission. Since data content in the PUSCH does not change in the period of the PUSCH repetition transmission, the base station 100 is likely to avoid deterioration of PUSCH data decoding properties. The base station 100 is therefore also likely to avoid deterioration of the ACK/NACK decoding properties.

In addition, in FIG. 18, if ACK/NACK repetition transmission and PUSCH repetition transmission simultaneously occur, the number of repetitions of an ACK/NACK is increased and becomes the same as the number of repetitions of a PUSCH, and the ACK/NACK decoding properties in the base station 100 can be improved.

It is to be noted that in FIG. 18, a case in which the number of repetitions of an ACK/NACK is smaller than the number of repetitions of data has been described. On the other hand, if the predetermined number of repetitions of an ACK/NACK is larger than the predetermined number of repetitions of data, the terminal 200 uses the predetermined number of repetitions of an ACK/NACK. In doing so, even if ACK/NACK repetition transmission and PUSCH repetition transmission simultaneously occur, ACK/NACKs and data are time-multiplexed transmitted in the PUSCH at least in a period of the PUSCH repetition transmission. Data content in the PUSCH therefore does not change in midstream, thereby avoiding deterioration of the data detection properties and the ACK/NACK decoding properties. On the other hand, a resource used for transmitting an ACK/NACK in a period of the ACK/NACK repetition transmission switches from a PUSCH to an ACK/NACK resource in the PUCCH. Even if the resource used for transmitting ACK/NACKs changes halfway through the ACK/NACK repetition transmission, however, the base station 100 can decode the ACK/NACKs without deteriorating the ACK/NACK decoding properties using the ACK/NACKs transmitted in the PUSCH in the period of the PUSCH repetition transmission and the ACK/NACKs transmitted using the ACK/NACK resources in periods other than the period of the PUSCH repetition transmission.

The embodiments of the present disclosure have been described.

It is to be noted that although cases in which the present disclosure is configured by hardware have been taken as examples in the embodiments, the present disclosure can be implemented by software that cooperates with hardware.

In addition, function blocks used to describe the embodiments are achieved as large-scale integration (LSI), which is typically an integrated circuit. These may be separately achieved as chips, or some or all of these may be achieved as a chip. Although LSI has been mentioned here, a term "integrated circuit (IC)", "system LSI", "super LSI", or "ultra LSI" might be used, instead, depending on a difference in a degree of integration.

In addition, a method for obtaining an integrated circuit is not limited to LSI, but an integrated circuit may be achieved as a dedicated circuit or a general-purpose processor. A field-programmable gate array (FPGA) for which programming can be performed after an LSI is fabricated or a reconfigurable processor capable of reconfiguring connections and settings of circuit cells inside an LSI may be used, instead.

Furthermore, if a technique for obtaining an integrated circuit that replaces LSI appears as a result of evolution of semiconductor technologies or from a different derivative technique, the function blocks may be achieved as integrated circuits using the technique. Application of a biological technology is a possibility.

A terminal in the present disclosure includes a receiver that receives information indicating a first subframe at which repetition transmission of an uplink signal starts and a second subframe at which repetition transmission of a response signal for a downlink data signal starts, and a transmitter that repeatedly transmits the uplink signal using a certain number of consecutive subframes starting with the first subframe and the response signal using at least the certain number of consecutive subframes starting with the second subframes. The first subframe is set to be the same as the second subframe.

In the terminal in the present disclosure, the first subframe and the second subframe are periodically set.

In the terminal in the present disclosure, a period of the first subframe is set to an integral multiple of a period of the second subframe.

In the terminal in the present disclosure, a period of the first subframe and a period of the second subframe are the same.

In the terminal in the present disclosure, a number of repetitions predetermined for the response signal and a number of repetitions predetermined for the uplink signal are the same.

In the terminal in the present disclosure, if a first number of repetitions predetermined for the response signal and a second number of repetitions predetermined for the uplink signal are different from each other and the repetition transmission of the response signal and the repetition transmission of the uplink signal occur in the same subframes, the number of repetitions of the response signal is set to the first number of repetitions or the second number of repetitions, whichever is larger.

In the terminal in the present disclosure, the uplink signal is a scheduling request to a base station from the terminal. If the repetition transmission of the response signal and repetition transmission of the scheduling request occur in the same subframes, the transmitter transmits the response signal using a resource for the scheduling request.

In the terminal in the present disclosure, the uplink signal is an uplink data signal. If the repetition transmission of the response signal and the repetition transmission of the uplink data signal occur in the same subframes, the transmitter time-multiplexes and transmits the response signal and the uplink data signal in an uplink data channel.

A base station in the present disclosure includes a setter that generates control information for identifying a first subframe at which repetition transmission of an uplink signal starts and a second subframe at which repetition transmission of a response signal for a downlink data signal starts, and a receiver that receives, from a terminal that has received the control information, the uplink signal repeatedly transmitted using a certain number of consecutive subframes starting with the first subframe and the response signal repeatedly transmitted using at least the certain number of consecutive subframes starting with the second subframe. The setter sets the first subframe to be the same as the second subframe.

A transmission method in the present disclosure includes receiving information indicating a first subframe at which repetition transmission of an uplink signal starts and a second subframe at which repetition transmission of a response signal for a downlink data signal starts, and repeatedly transmitting the uplink signal using a certain number of consecutive subframes starting with the first subframe and the response signal using at least the certain number of consecutive subframes starting with the second subframe. The first subframe is set to be the same as the second subframe.

A reception method in the present disclosure includes generating control information for identifying a first subframe at which repetition transmission of an uplink signal starts and a second subframe at which repetition transmission of a response signal for a downlink data signal starts, and receiving, from a terminal that has received the control information, the uplink signal repeatedly transmitted using a certain number of consecutive subframes starting with the first subframe and the response signal repeatedly transmitted using at least the certain number of consecutive subframes starting with the second subframe. In the generating, the first subframe is set to be the same as the second subframe.

Disclosures in the specification, drawings, and abstract included in Japanese Patent Application No. 2014-017133 filed Jan. 31, 2014 are all used to assist the present application.

The present disclosure is useful in a mobile communication system.

What is claimed is:

1. A terminal comprising:
a receiver which, in operation, receives information indicating a first subframe at which repetition transmission of an uplink signal starts and a second subframe at which repetition transmission of a response signal for a downlink data signal starts; and
a transmitter which, in operation, repeatedly transmits the uplink signal using a defined number of consecutive subframes starting with the first subframe and the response signal using at least the defined number of consecutive subframes starting with the second subframe,
wherein the first subframe is set to be the same as the second subframe, and
wherein, if a first number of repetitions predetermined for the response signal and a second number of repetitions predetermined for the uplink signal are different from each other and the repetition transmission of the response signal and the repetition transmission of the uplink signal occur in the same subframes, the number of repetitions of the response signal is set to the first number of repetitions or the second number of repetitions, whichever is larger.

2. The terminal according to claim 1,
wherein the first subframe and the second subframe are periodically set.

3. The terminal according to claim 2,
wherein a period of the first subframe is set to an integral multiple of a period of the second subframe.

4. The terminal according to claim 2,
wherein a period of the first subframe and a period of the second subframe are the same.

5. The terminal according to claim 1,
wherein the uplink signal is a scheduling request to a base station from the terminal, and
wherein, if the repetition transmission of the response signal and the repetition transmission of the scheduling request occur in the same subframes, the transmitter transmits the response signal using a resource for the scheduling request.

6. The terminal according to claim 1,
wherein the uplink signal is an uplink data signal, and
wherein, if the repetition transmission of the response signal and the repetition transmission of the uplink data signal occur in the same subframes, the transmitter time-multiplexes and transmits the response signal and the uplink data signal in an uplink data channel.

7. A base station comprising:
circuitry which, in operation, generates control information for identifying a first subframe at which repetition transmission of an uplink signal starts and a second subframe at which repetition transmission of a response signal for a downlink data signal starts;
a transmitter which, in operation, transmits the control information to a terminal; and
a receiver which, in operation, receives, from the terminal that has received the control information, the uplink signal repeatedly transmitted using a defined number of consecutive subframes starting with the first subframe and the response signal repeatedly transmitted using at least the defined number of consecutive subframes starting with the second subframe, wherein the circuitry sets the first subframe to be the same as the second subframe, and wherein, if a first number of repetitions predetermined for the response signal and a second number of repetitions predetermined for the uplink signal are different from each other and the repetition transmission of the response signal and the repetition transmission of the uplink signal occur in the same subframes, the number of repetitions of the response signal is set to the first number of repetitions or the second number of repetitions, whichever is larger.

8. A transmission method comprising:

receiving information indicating a first subframe at which repetition transmission of an uplink signal starts and a second subframe at which repetition transmission of a response signal for a downlink data signal starts; and repeatedly transmitting the uplink signal using a defined number of consecutive subframes starting with the first subframe and the response signal using at least the defined number of consecutive subframes starting with the second subframe, wherein the first subframe is set to be the same as the second subframe, and wherein, if a first number of repetitions predetermined for the response signal and a second number of repetitions predetermined for the uplink signal are different from each other and the repetition transmission of the response signal and the repetition transmission of the uplink signal occur in the same subframes, the number of repetitions of the response signal is set to the first number of repetitions or the second number of repetitions, whichever is larger.

9. A reception method comprising:

generating control information for identifying a first subframe at which repetition transmission of an uplink signal starts and a second subframe at which repetition transmission of a response signal for a downlink data signal starts; and receiving, from a terminal that has received the control information, the uplink signal repeatedly transmitted using a defined number of consecutive subframes starting with the first subframe and the response signal repeatedly transmitted using at least the defined number of consecutive subframes starting with the second subframe, wherein the first subframe is set to be the same as the second subframe, and wherein, if a first number of repetitions predetermined for the response signal and a second number of repetitions predetermined for the uplink signal are different from each other and the repetition transmission of the response signal and the repetition transmission of the uplink signal occur in the same subframes, the number of repetitions of the response signal is set to the first number of repetitions or the second number of repetitions, whichever is larger.

10. A terminal comprising:

a memory that stores instructions; and a processor that executes the instructions;

wherein, when executed by the processor, the instructions cause the processor to perform operations comprising:

receiving information indicating a first subframe at which repetition transmission of an uplink signal starts and a second subframe at which repetition transmission of a response signal for a downlink data signal starts; and repeatedly transmitting the uplink signal using a defined number of consecutive subframes starting with the first subframe and the response signal using at least the defined number of consecutive subframes starting with the second subframe, wherein the first subframe is set to be the same as the second subframe, and wherein, if a first number of repetitions predetermined for the response signal and a second number of repetitions predetermined for the uplink signal are different from each other and the repetition transmission of the response signal and the repetition transmission of the uplink signal occur in the same subframes, the number of repetitions of the response signal is set to the first number of repetitions or the second number of repetitions, whichever is larger.

* * * * *